United States Patent [19]
Vertatschitsch et al.

[11] Patent Number: 5,294,075
[45] Date of Patent: Mar. 15, 1994

[54] HIGH ACCURACY OPTICAL POSITION SENSING SYSTEM

[75] Inventors: Edward J. Vertatschitsch, Bothell; Gregory L. Abbas, Fall City; Michael de La Chapelle, Bellevue; J. Doyle McClure, Brier, all of Wash.

[73] Assignee: The Boeing Company, Seattle, Wash.

[21] Appl. No.: 752,109

[22] Filed: Aug. 28, 1991

[51] Int. Cl.$^5$ .............................................. B64C 5/00
[52] U.S. Cl. .............................. 244/75 R; 244/3.17; 359/169; 359/170
[58] Field of Search ............... 244/3.16, 3.17, 75 R, 244/175, 220, 221; 359/169, 170, 173; 356/5, 6, 363

[56] References Cited

U.S. PATENT DOCUMENTS

| | | | |
|---|---|---|---|
| 3,900,260 | 8/1975 | Wendt | 356/5 |
| 3,932,745 | 1/1976 | Hartman | 356/6 |
| 4,011,445 | 3/1977 | O'Meara | 250/199 |
| 4,044,247 | 8/1977 | Brown, Jr. | 250/199 |
| 4,097,007 | 6/1978 | Fagan et al. | 244/3.11 |
| 4,777,660 | 10/1988 | Gould et al. | 359/169 |
| 4,777,661 | 10/1988 | Spillman, Jr. | 455/605 |
| 4,824,251 | 4/1989 | Slotwinski et al. | 356/349 |
| 4,830,486 | 5/1989 | Goodwin | 356/5 |
| 4,848,906 | 7/1989 | Layton | 356/345 |
| 5,031,234 | 7/1991 | Primas et al. | 359/169 |

OTHER PUBLICATIONS

Gregory L. Abbas et al., "High-Precision Fiber-Optic Position Sensing Using Diode Laser Radar Techniques," *SPIE, Laser-Diode Technology and Applications II*, vol. 1219, 1990, pp. 468-479.

Michael de La Chapelle et al., "Diode Laser Radar System Analysis and Design For High Precision Ranging," *SPIE, Laser Diode Technology and Applications*, vol. 1043, 1989, pp. 228-237.

Breck W. Henderson, "Boeing Develops Fiber Optic Components For Future Aircraft," *Aviation Week and Space Technology*, May 7, 1990, pp. 84-85.

W. B. Spillman, Jr.,. et al., "Performance Of Integrated Source/Detector Combinations For Smart Skins Incoherent Optical Frequency Domain Reflectory (IOFDR) Distributed Fiber Optic Sensors," *SPIE, Fiber Optic Smart Structures and Skins*, 1988, pp. 106-118.

R. Gallay et al., "Fibre Optic Sensor Multiplexing By FMAMCW," *Phys. D. Appl. Phys.* 21, 1988, pp. 144-146.

K. I. Mallalieu et al., "FMCW Of Optical Source Enevelope Modulation For Passive Multiplexing Of Frequency-Based Fibre-Optic Sensors", Jun. 12, 1986, 2 pages.

Patent Abstracts of Japan, vol. 12, No. 388 (P-771) Oct. 17, 1988 & SP,A,63 131 006 (Yaskawa Elec. Mfg. Co Ltd Jun. 3, 1988, see abstract).

M. Kunt 'traitment numérique des signaux' 1981, Dunod, Montrouge, FR, see section 4.7.8, pp. 173-174.

*Primary Examiner*—Margaret A. Focarino
*Assistant Examiner*—Christopher P. Ellis
*Attorney, Agent, or Firm*—Spencer, Frank & Schneider

[57] ABSTRACT

An optical position sensing system for sensing the position of a displaceable element. An electro-optical unit outputs a modulated optical signal and a chirped rf signal. The envelope of the modulated optical signal has a phase that has a known relation to the phase of the chirped rf signal. The electro-optical unit is coupled to a light guide element and receives and transmits the modulated optical signal along an optical path for reflection off a surface of the displaceable element in order to provide a position sensing optical signal. A reference reflecting element is disposed in the optical path upstream of the displaceable element for partially reflecting the transmitted modulated optical signal in order to provide a reference optical signal. A transducing unit receives the rf signal at one input and has another input optically coupled for receiving the position sensing optical signal and the reference optical signal which have, respectively, first and second time delays with respect to the chirped rf signal. The transducing unit produces a multi-frequency electrical signal which includes first and second frequencies corresponding to the first and second time delays, respectively. A position detecting unit coupled to the output of the transducing unit processes the multi-frequency signal in order to determine a difference frequency corresponding to the difference between the first and second frequencies and representing the position of the displaceable element.

68 Claims, 22 Drawing Sheets

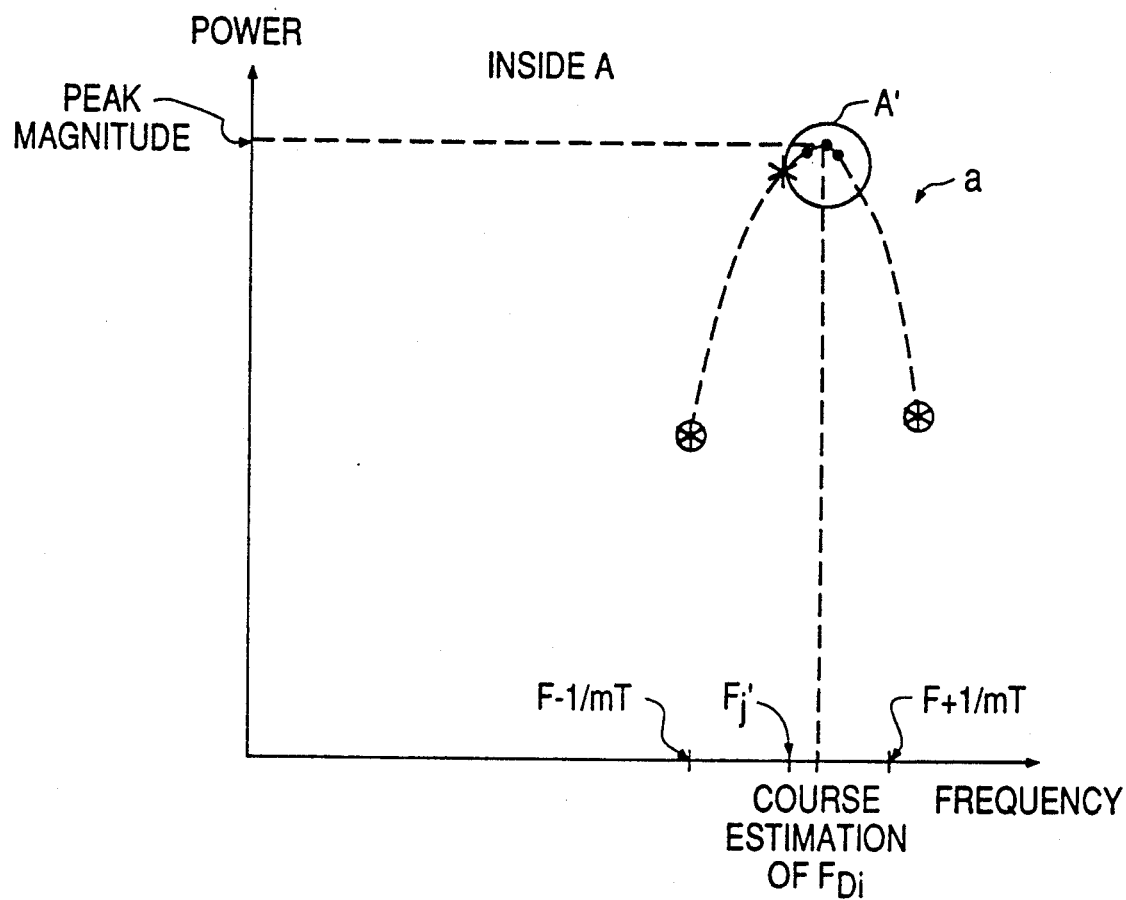

HIGH ACCURACY OPTICAL POSITION SENSING SYSTEM

BACKGROUND OF THE INVENTION

1. Field of the Invention

This invention relates generally to an apparatus and method for sensing physical phenomena and particularly to an optical position sensing system for detecting the position of one or more displaceable elements. Still more particularly, the invention relates to a high accuracy light radar, fiber optic position sensing system for use on an aircraft in order to measure positions of various moving parts of the aircraft at high rates and with short lag times.

2. Background of the Related Art

Traditionally, electrical sensors are used to measure the position of various actuators in an aircraft which are used, for example, to control the position of various aerodynamic surfaces, such as flaps, rudder, ailerons, etc. Results of these measurements are then fed back to a system flight controller which processes this information and outputs appropriate commands to control the actuators.

A typical actuator has a rod secured within an outer casing. Depending on the actuator, the rod can move back and forth a maximum distance of a few millimeters to over 50 cms. This maximum distance is often referred to as a stroke. A sensor head associated with the actuator sends a position signal representing the position of the actuator rod to a processor that calculates a position measurement. Position measurements of the rod must be fed to the flight controller at rates up to several hundred Hz, with a lag time less than 0.5 ms, and accuracies of a few hundred micrometers. Here, lag time is defined to be the time between completion of raw data collection from a sensor and transmission of a position measurement to the flight controller.

Fiber optic position sensing systems offer numerous advantages over conventional electrical sensing systems. First, they are small and lightweight. In addition, they can be made immune from electromagnetic interference (EMI) which can occur near power lines, and electromagnetic pulses (EMP) which can occur in the event of a nuclear explosion. EMI/EMP immunity is an especially important advantage for new generation aircraft which have skins made largely of composite (non-metallic, non-shielding) material. Without heavy, bulky and expensive shielding of conventional electrical sensors and control lines, these next generation aircraft can not be safely flown in areas of severe EMI/EMP. Therefore, "fly-by-light" systems or fiber optic position sensing systems have the potential to replace "fly-by-wire" systems in future aircraft.

Some fiber optic position sensing systems use digital or optical encoding techniques in order to vary the amplitude of an incident optical signal as a surface is moved. However, sensor heads for these types of sensor systems cannot be easily multiplexed and consequently cost, complexity, weight and volume of the system are increased.

Another type of fiber optic position sensor system sometimes called an optical time domain reflectometer (OTDR) uses a pulsed optical source. In particular, OTDRs measure distances to in-line fiber reflectors by estimating a round trip transit time of a light pulse from the pulsed optical source to the in-line fiber reflector and back to a detector. Both the measurement accuracy and estimation times are fundamentally limited by the amplitude and width of the light pulse. Consequently, conventional OTDRs are usually only capable of position measurement accuracies of 5 to 500 centimeters. Some OTDRs measure distances to a Fresnel reflector at a fiber end face with submillimeter accuracy using pulse widths of 50 to 100 pS. However, these OTDRs require estimation times which are orders of magnitude longer than the submillisecond lag times $T_{Li}$ and cannot achieve the several hundred Hz update rates $R_i$ required for aircraft position sensing applications. Finally, it can be difficult to multiplex multiple sensor heads in OTDR systems.

Still another type of fiber optic position sensor system is a coherent optical frequency domain reflectometer (COFDR). COFDRs use coherent frequency modulated (FM) optical radiation. However, optical sources used in the COFDR must have narrow line widths and therefore tend to have low output power and low reliability. Moreover, all fibers used in COFDRs must be single mode polarization preserving fibers in order to coherently optically mix returned FM optical signals with an optical local oscillator signal and consequently are difficult to install and maintain.

Another drawback of coherent FM systems is due to the large Doppler shifts which can occur. For example, a rod in an actuator can have velocities ranging up to several centimeters per second. Passive sensor heads measure the position of the rod by reflecting or scattering optical radiation from an end face of the rod. Hence, the frequency of this scattered optical radiation is Doppler shifted. Since the Doppler shift is proportional to the frequency of the optical radiation, it can be very large. For example, if the rod is moving at two centimeters per second, then the Doppler shift for optical radiation having a wavelength of 1.06 micrometers is about 38 kHz which can result in significant errors in position measurement.

One way to eliminate such errors is to utilize first an up and then a down chirp and measure two different beat or intermediate (IF) frequencies. These two beat frequencies can then be subtracted from each other thereby cancelling out the Doppler shift. However, this requires wide bandwidth detectors and filters which reduces the signal-to-noise ratio of the measurements and consequently the accuracy of the measurements. In addition, this approach requires two time periods to obtain one position measurement.

Finally, a fourth approach to fiber optic position sensing systems with passive sensor heads involves incoherent optical frequency domain reflectometry (IOFDR). IOFDR is discussed, for example, in "Performance of Integrated Source/Detector Combinations for Smart Skins Incoherent Optical Frequency Domain Reflectometry (IOFDR) Distributed Fiber Optic Sensors," by W. B. Spillman, Jr., P. L. Fuhr and B. L. Anderson, SPIE Vol. 986, *Fiber Optic Smart Structures and Skins* (1988). An IOFDR is shown in FIG. 6a of the Spillman reference. There the IF signal appears at the output of a mixer. The frequency of this IF signal is proportional to the time delay introduced by a white cell. However, this system is not capable of outputting position measurements at rates $R_i$ of several hundred Hz, lag times $T_{Li}$ under 0.5 ms and position accuracies $\delta L_{Si}$ of several hundred micrometers which is required for a flight controller to control flight of an aircraft.

Other attempts have been made to implement IOFDRs. For example, "Fiber Optic Sensor Multiplexing by FMAMCW," by R. Gallay et al., *Appl. Phys.* 21 (1989) discloses a sensor network with three sensors $L_1$–$L_3$. However, this system is also incapable of update rates $R_i$ of several hundred Hz with lag times $T_{Li}$ under 0.5 ms or position measurement accuracies $\delta L_{Si}$ of several hundred micrometers.

Therefore, IOFDRs or frequency modulated continuous wave (FM-CW) systems have thus far been limited in their estimation of a target's position.

SUMMARY OF THE INVENTION

An object of the invention is therefore to provide an optical position sensing system capable of simultaneously obtaining high accuracy position measurements from a plurality of position sensor heads at high rates, high accuracy and short lag times.

Another object of the invention is to provide an optical position sensing system to be used on an aircraft with a controller which controls flight of the aircraft.

Another object of the invention is to provide an optical position sensing system with passive sensor heads and easy to shield active electronics, thereby making the sensing system immune to EMI and EMP.

Another object of the invention is to provide a small and lightweight optical position sensing system.

Another object of the invention is to provide an inexpensive and reliable optical position sensing system.

An advantage of the invention is that it can obtain position measurements which are independent of external temperature changes and vibrations.

Another advantage of the invention is that errors due to nonlinearities in a ramped RF source signal are cancelled out.

Another advantage of the invention is that it is capable of multiplexing a plurality of different types of position sensor heads.

Another advantage of the invention is that it provides position measurements which are nearly independent of Doppler shifts due to motion of the object whose position is to be measured.

A feature of the invention is that it uses passive sensor heads.

Another feature of the invention is that a target and a reference signal are used to measure a position of a target reflector.

Another feature of the invention is that a ramped RF source is used to intensity modulate a light source.

Another feature of the invention is that it can use multi-mode optical fibers.

Another feature of the invention is that position measurements are updated using a tracker.

Another feature of the invention is that a single optical fiber can be used at the sensor head to transmit and receive an optical signal.

Another feature of the invention is that the sensor head can often be located inside the actuator, where it is known to have improved reliability.

The above and other objects, advantages and features are accomplished in accordance with the invention by the provision of an optical position sensing system for sensing the position of a displaceable element including: electro-optical means for outputting a modulated optical signal and a chirped rf signal, the envelope of the modulated optical signal having a phase that has a known relation to the phase of the chirped rf signal; light guide means coupled to the electro-optical means for receiving and transmitting the modulated optical signal along an optical path for reflection off a surface of the displaceable element to provide a position sensing optical signal; reference reflecting means disposed in the optical path upstream of the displaceable element for partially reflecting the transmitted modulated optical signal to provide a reference optical signal; transducing means having an output and two inputs, one of the two inputs electrically coupled for receiving the chirped rf signal and the other of the two inputs optically coupled for receiving the position sensing optical signal and the reference optical signal having, respectively, first and second time delays with respect to the chirped rf signal, the transducing unit producing at its output a multi-frequency electrical signal which includes first and second frequencies corresponding to the first and second time delays, respectively; and position detecting means coupled to the output of the transducing means for processing the multi-frequency signal for determining a difference frequency corresponding to the difference between the first and second frequencies representing the position of the displaceable element.

In accordance with one embodiment of the invention, the position detecting means includes non-linear means for squaring the multi-frequency signal and outputting a squared signal including a difference signal having a peak region in the frequency domain containing the difference frequency which is subsequently detected by digital techniques. In another embodiment, the position detecting means, includes an analogue-to-digital converter for converting the multi-frequency signal to a digital signal which is passed to a digital processor for digital squaring to produce a squared signal including a difference signal having a peak region in the frequency domain containing the difference frequency.

In a further aspect of the invention, the displaceable element is displaceable over a given stroke, and the position detecting means detects an initial difference frequency by searching for the difference frequency over a range of frequencies corresponding to the stroke of the displaceable element. In yet another aspect of the invention, the position detecting means includes means for tracking the difference frequency, as the difference frequency changes corresponding to variations in the position of the displaceable element, by utilizing the initial difference frequency.

The above and other objects, advantages and features are further accomplished in accordance with the invention by the provision of a method for determining the position of a displaceable element including: producing a chirped rf signal; producing a modulated optical signal having an envelope of modulation with a phase that is known with respect to the phase of the chirped rf signal; transmitting the modulated optical signal along an optical path and reflecting the modulated optical signal off a surface of the displaceable element to provide a position sensing optical signal; partially reflecting the transmitted optical signal at a point in the optical path prior to the surface of the displaceable element to provide a reference optical signal; producing an electrical signal as a function of first and second time delays of the position sensing optical signal and the reference optical signal, respectively, with reference to the chirped rf signal mixing the chirped rf signal and the electrical signal to produce a multi-frequency signal with first and second frequencies corresponding to the first and second time delays, respectively; and detecting a difference frequency of the multifrequency signal corresponding to the difference between the first and second frequencies, the difference frequency representing the position of the displaceable element.

In accordance with another aspect of the invention, the displaceable element is a component in an aircraft. The aircraft includes a flight controller which receives and utilizes the difference frequency for controlling operation of the aircraft and the detecting step includes detecting and outputting the difference frequency to the flight controller at a sufficient rate, a sufficient accuracy and a sufficiently short lag time for the flight controller to maintain control of the aircraft.

In accordance with a further aspect of the invention, the detecting step includes squaring the multi-frequency signal and outputting a multi-frequency signal having the difference frequency. According to another aspect of the inventive method, the detecting step includes acquiring/searching and updating/tracking the difference frequency.

The above and other objects, effects, features and advantages of the present invention will become more apparent from the following description of embodiments thereof taken in conjunction with the accompanying drawings.

BRIEF DESCRIPTION OF THE DRAWINGS

FIG. 11a shows the difference signal after zero padding and Fourier transformed and amplitude squared and FIGS. 11b and 11c show the peak of the difference signal after performing a quadratic fit corresponding to steps 206 and 224, respectively, of FIG. 10.

DETAILED DESCRIPTION OF PREFERRED EMBODIMENTS

Figure 1:
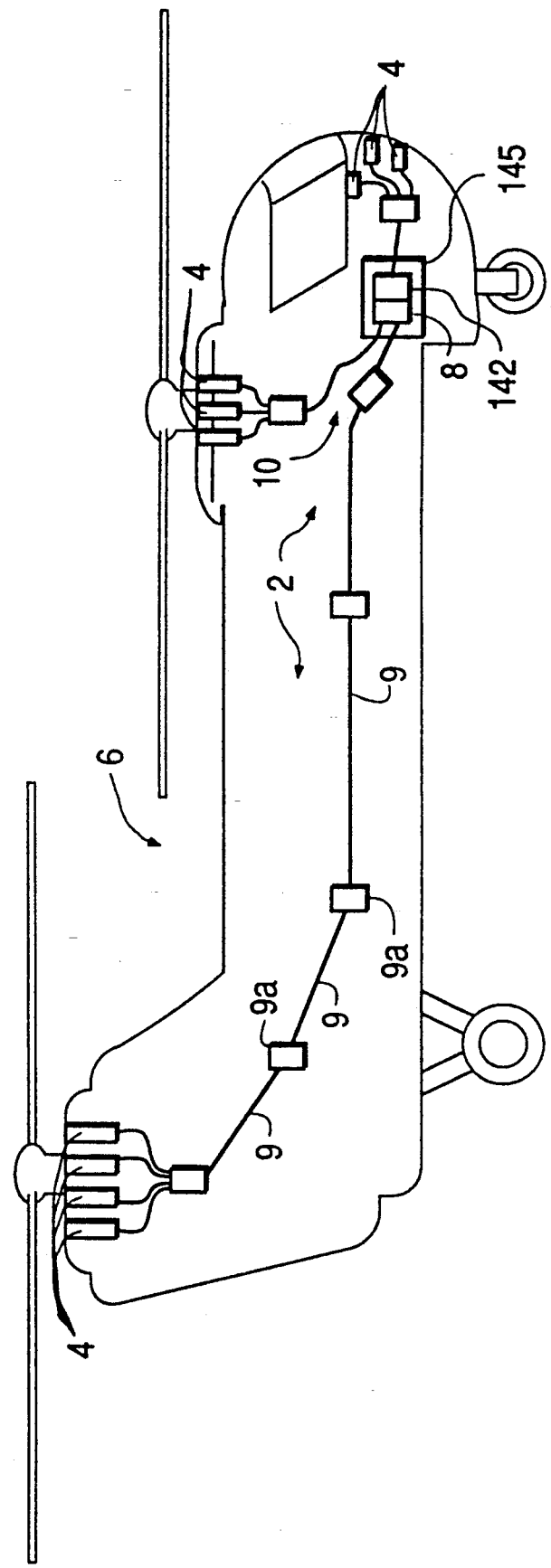
FIG. 1 is a schematic showing an application of an optical position sensing system according to the invention in a helicopter.

In order to realize a small, lightweight fiber optic position sensor system which has EMI/EMP immunity, it is desirable to use passive sensor heads in which all electrical connections at the sensor heads are eliminated. FIG. 1 shows an optical position sensing system 2 with passive sensor heads 4 in a helicopter 6 with a flight controller 8. Optical signals are coupled between sensor heads 4 and flight controller 8 by a light guide system, which in the disclosed embodiment comprises optical fibers 9 and optical connectors 9a connecting together different sections of optical fibers. As can be seen, if N passive sensor heads 4 are used, all electrical connections for fiber optic position sensor system 2 and controller 8 can be maintained in a centralized, easy to shield location 10.

Figure 2:
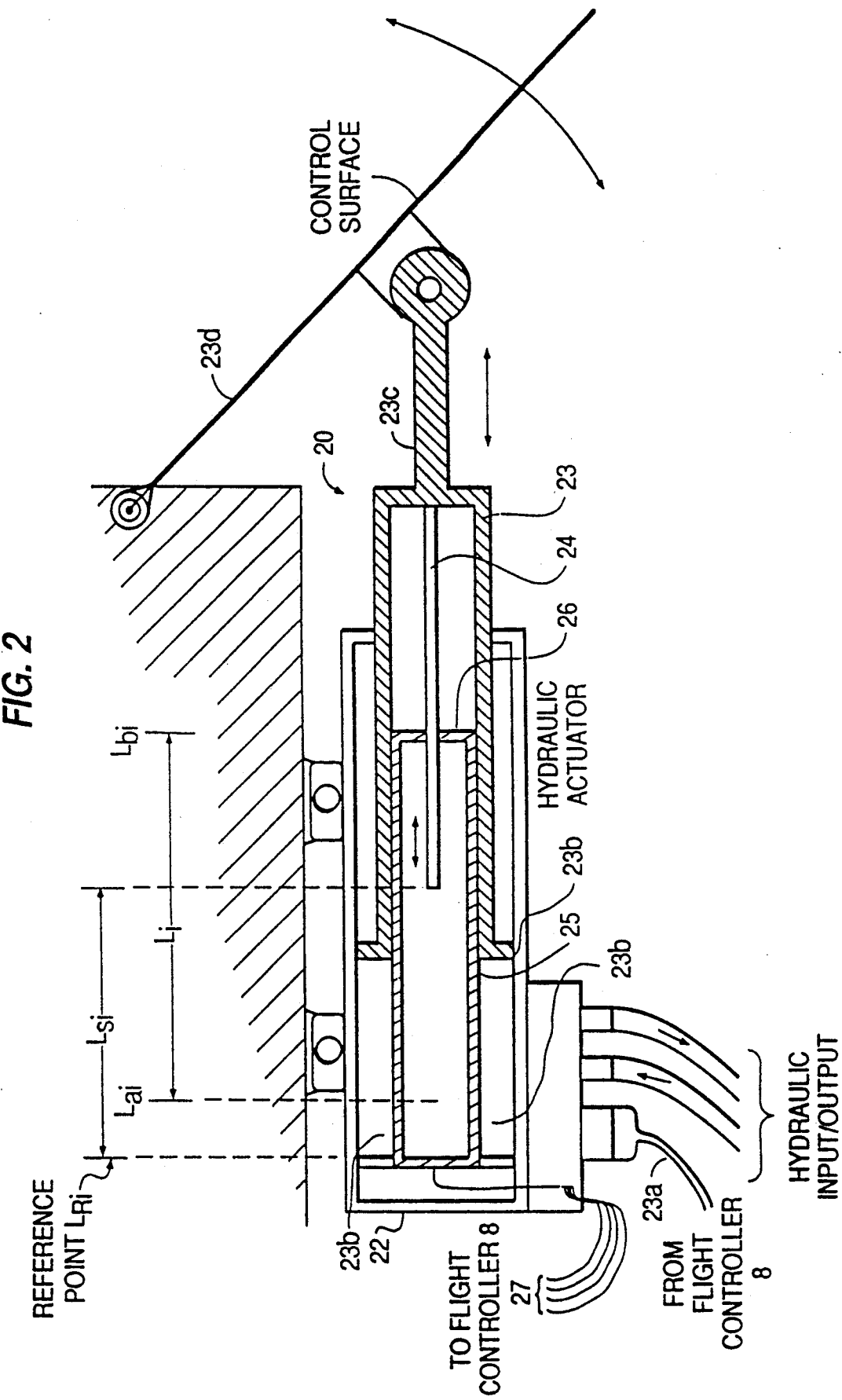
FIG. 2 shows a partially broken away side view of a typical linear actuator which can be used with the optical position sensing system of the invention.

FIG. 2 shows an example of an actuator 20 (Boeing 767 outboard spoiler) associated with one of the passive sensor heads 4 schematically shown in FIG. 1. Actuator 20 has an outer casing 22 within which a metal tube 23 moves in response to control signals from flight controller 8 input on wires 23a which control hydraulic valves (not shown) causing hydraulic pressure in cavity 23b to increase or decrease thereby causing metal tube 23 to slide back and forth within outer casing 22. Metal tube 23 is connected to an outer rod 23c which is attached at its right-hand end to an object 23d such as a control surface to be controlled by the flight controller. Rod 24 is secured to metal tube 23 and moves within a sensor casing 25 guided by a sealing ring 26. Rod 24 can move between points Lai and Lbi a total stroke length $L_i =$ Lai-Lbi, and at any point in time rod 24 is at a position $L_{Si}$ with respect to a reference point $L_{Ri}$. An electrical sensor head for actuator 20 has several coils of wire (not shown) wrapped around sensor tube 25 which output signals corresponding the position of rod 25 to flight controller 8 via wires 27. A typical electrical sensor is GM6850E linear transducer by Kavlico Corporation. Stroke $L_i$ can vary from several millimeters to over 50 centimeters. In addition, the position $L_{Si}$ of rod 24 must be updated and sent to flight controller 8 at rates $R_i$ of several hundred Hz and with lag times $T_{Li}$ under 0.5 ms. Again, lag time $T_{Li}$ is defined to be the time from which data is sensed from $i^{th}$ passive sensor head 4 to the time the position measurement $L_{Si}$ is calculated and transmitted to flight controller 8. Finally, position measurements must be made with an accuracy of $\delta L_{Si}$ of a few hundred micrometers and preferably less than 100 micrometers. In addition, controller 8 must simultaneously receive position information from all passive sensor heads 4. Sensor head 4 can be completely embedded inside actuator 20. Depending on the object (control surface) to which actuator 20 is attached, controller 8 may require position information at rates of several hundred Hz in order to complete a feedback loop thereby maintaining operation of the aircraft. Controller 8 can be a computer or microcomputer and completes flight control loops in a known matter.

Figure 3:
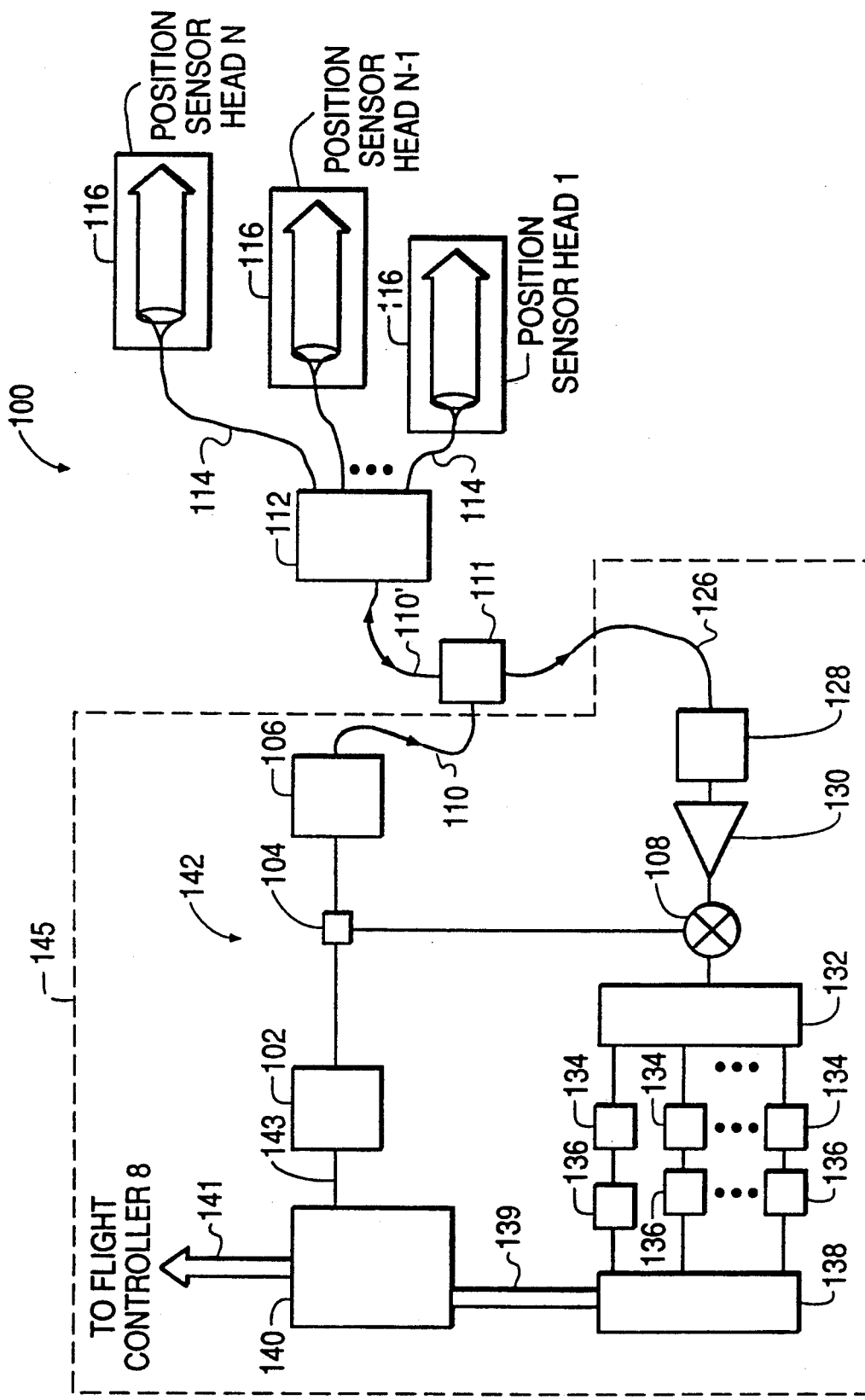
FIG. 3 is a block circuit diagram of one embodiment of optical position sensing system according to the invention.

An embodiment of an optical position sensing system 100 according to the invention is shown in FIG. 3. An RF chirp source 102 produces an RF signal with a linearly varying frequency over a chirp duration T. This RF signal is sometimes referred to as a "chirped" RF signal. The chirped RF signal is split into two chirped RF signals using an RF splitter or power divider 104. One of the two chirped RF signals is used to drive (intensity modulate) a light source 106 and the other is used as an RF local oscillator signal which is input to an RF mixer 108. Light source 106 outputs an intensity modulated (IM) optical signal with an envelope which is chirped in phase with the chirped RF signal. The chirped IM optical signal is guided down a first transmitting optical fiber 110 to an optical coupler 111 and then to an optical coupler 112 via transmitting-/receiving fiber 110' where it is divided, in a known manner, into N chirped IM optical signals, where N is a positive integer. These N chirped IM optical signals are input to N second transmitting optical fibers 114 each of which transmits one of the N chirped IM optical signals to one of N position sensor heads 116 (corresponding to sensor heads 4 in FIG. 1).

RF chirp source 102 can be an electrically controlled rf source such as a YIG tuned oscillator for example as Ferretec FS02106. RF chirp source 102 can also be a processor with a digital-to-analog converter that creates digital signals representing RF chirps and then digital-to-analog converts the chirps. Light source 106 could be a laser diode such as Lasertron QLM1300MW, a solid state laser, or even a light emitting diode (LED). First transmitting fiber 110 and N second transmitting fibers 114 can be multi-mode or single mode fibers. An example of RF splitter 104 is Picosecond Labs 5330. An example of optical coupler 111 is Australian Optical Fiber AOFR AS50-09-R-C-ST which is a 2×2 asymmetric coupler. If light source 106 is a pigtailed diode laser with fiber 110 being a single mode fiber and pigtailed to light source 106 then coupler 111 can be a multimode coupler and yet optical coupling loses remain low ($\approx$3dB) since the single mode pigtail excites only lower order modes in transmitting/receiving fiber 110' and multimode transmitting fibers 114 when light approaches sensor heads 116.

Figure 4:
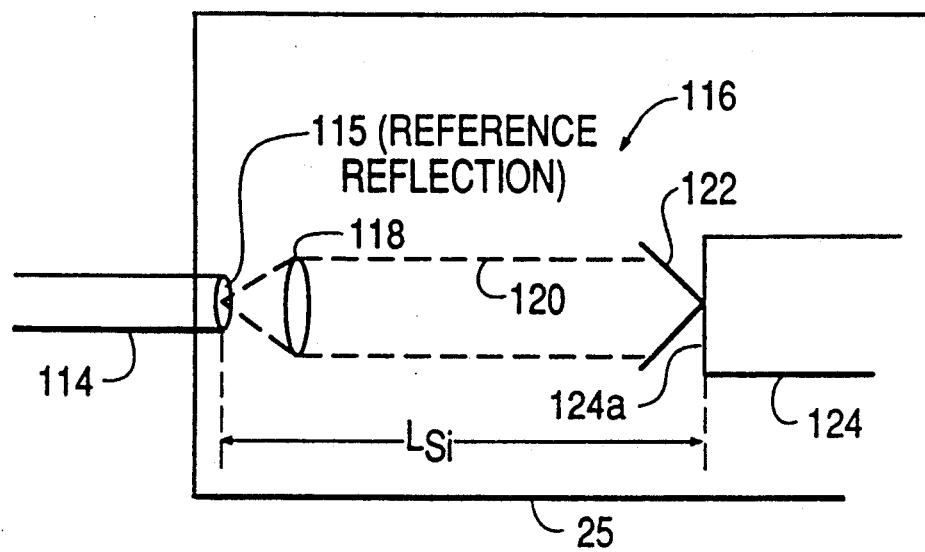
FIG. 4 shows an enlarged view of position sensor head shown in FIG. 3.

FIG. 4 shows a closeup view of one of the position sensor heads 116 corresponding to sensor heads 4 in FIG. 1. Sensor head 116 is embedded in sensor tube 25. One of the N chirped IM optical signals is output by a second transmitting fiber 114 to a lens 118 which collimates the chirped IM optical signal into a collimated beam 120. Collimated beam 120 travels to a corner cube 122 which acts as a retroreflector reflecting the collimated beam 120 back through lens 118 and into second transmitting fiber 114. Corner cube 122 is secured to an end face 124a of a rod 124 which corresponds, for example, to rod 24 in actuator 20 shown in FIG. 2. Any type of reflecting surface can be used in lieu of corner cube 122 as long as it scatters sufficient optical energy back to second transmitting fiber 114. For example, the end of rod 124 can be coated with a commercially available retroreflective material or the end surface of rod 124 may already be sufficiently reflective to serve the intended purpose.

After scattering off corner cube 122, beam 120 passes back through lens 118 as a chirped IM optical target signal (sometimes referred to herein as a position sensing optical signal) and into second transmitting fiber 114 which guides the chirped IM optical target signal back to optical coupler 112. This occurs for each of N position sensor heads 116 corresponding to N second transmitting fibers 114. Returning to FIG. 3, the N chirped IM optical target signals are then redirected by optical coupler 112 to transmitting/receiving fiber 110' to coupler 111 then to a receiving fiber 126 which guides the N chirped IM optical target signals to a photodiode receiver (or detector) 128. Photodiode receiver 128 detects the N chirped IM optical target signals and outputs corresponding N delayed chirped RF target signals. Receiving fiber 126 can also be a single or multi-mode fiber. An example of photodiode receiver 128 is Antel ARD-28.

First transmitting fiber 110, transmitting/receiving fiber 110' second transmitting fiber 114 and receiving fiber 126 introduce a time delay $\delta T_{Ri}$ for the $i^{th}$ chirped IM optical signal. The 110' sensor head 116 delays the $i^{th}$ chirped IM optical signal by an additional amount, $\delta t_i$ corresponding to the time that beam 120 travels a distance $\delta L_{Si}$. That is, beam 120 travels from tip 115 of second transmitting fiber 114 through lens 118 to corner cube 122 back through lens 118 and to tip 115 in time $\delta t_i$. Therefore, the total delay $\delta T_{Ti}$ for the $i^{th}$ chirped IM optical signal is $$\delta T_{Ti} = \delta T_{Ri} + \delta t_i. \qquad \text{Eq. (1)}$$

Photodiode receiver 128 outputs N delayed chirped RF target signals starting at N different times corresponding to N delays $\delta T_{T1}, \ldots, \delta T_{TN}$. These N delayed chirped RF target signals are amplified by a linear amplifier 130 which outputs N amplified RF target signals to RF mixer 108. RF mixer 108 mixes the N amplified RF target signals with the RF local oscillator signal from RF splitter 104. An example of linear amplifier 130 is Miteq AFS4-00101000-30-10P-4, and an example of RF mixer 108 is Avantek TFX18075L.

Figure 5A:
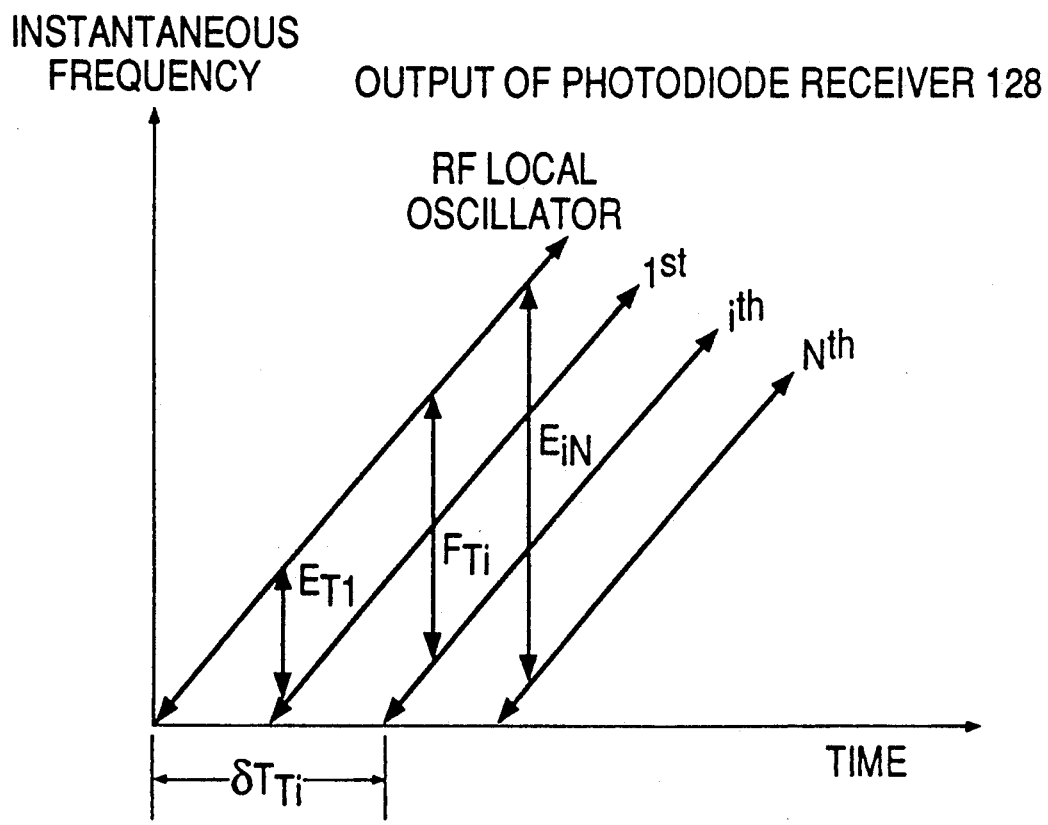
FIGS. 5a-5c show graphical representations of an RF mixing process at mixer 108 in FIG. 3
Figure 5B:
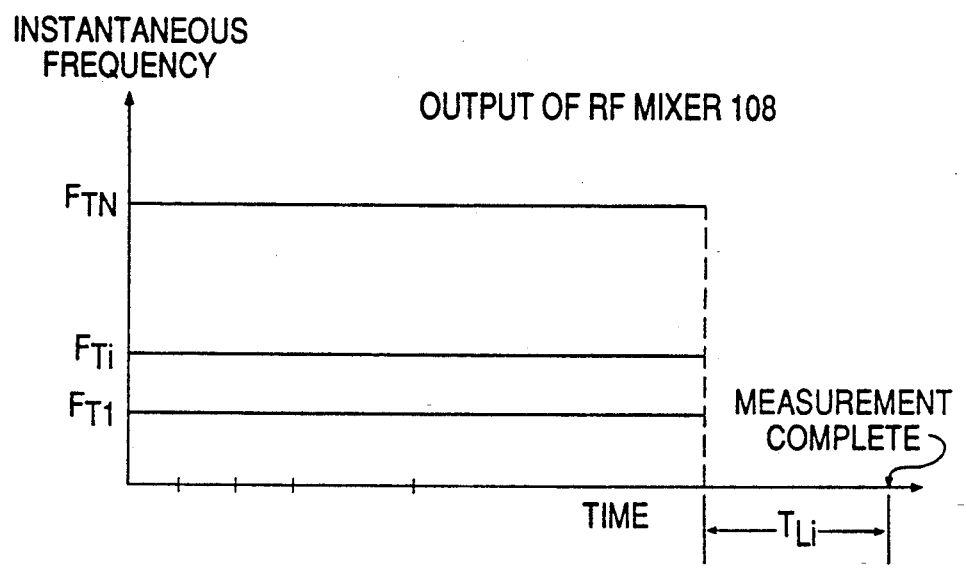
Figure 5C:
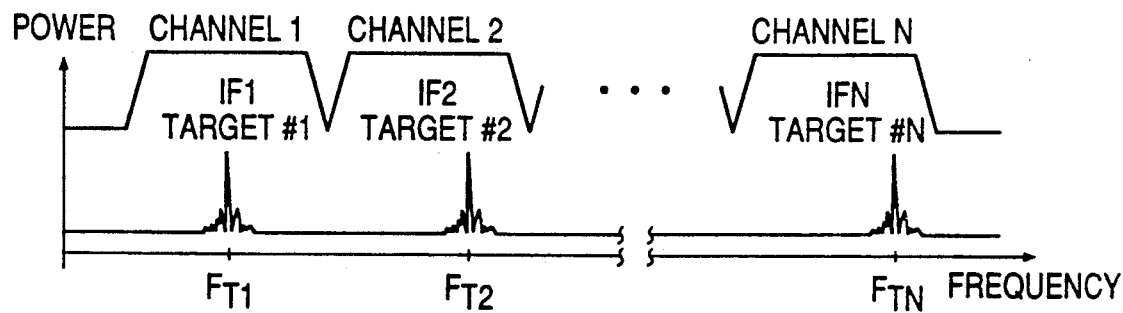

FIGS. 5a-5c show graphical representations of the RF mixing process. FIG. 5a is a graphical representation (not to scale) in frequency versus time of the RF chirped local oscillator signal and the 1 st, ..., ith, ..., $N^{th}$ delayed chirped RF target signals at the inputs of RF mixer 108. The 1 st, ..., ith, ..., $N^{th}$ delayed chirped RF target signals have delays $\delta T_{T1}, \ldots, \delta T_{Ti}, \ldots, \delta T_{TN}$, respectively.

FIG. 5b is a graph in frequency versus time of the N intermediate frequency (IF) target signals output by RF mixer 108. In particular, mixing the RF local oscillator signal with the N delayed chirped RF target signals results in N intermediate frequency (IF) target signals with peak frequencies $F_{T1}, \ldots, F_{Ti}, \ldots, F_{TN}$, corresponding to delays $\delta T_{T1}, \ldots, \delta T_{Ti}, \ldots, \delta T_{TN}$, respectively.

FIG. 5c shows a Fourier transformation of the N intermediate frequency target signals when delays $\delta T_{T1}, \ldots, \delta T_{TN}$ are adequately spaced apart; namely, when the lengths of N second transmitting fibers 114 are chosen such that the peak frequencies $F_{T1}, F_{T2}, \ldots, F_{TN}$ are sufficiently spread apart to be filtered later.

Returning to FIG. 3, an N channel filter or de-multiplexing filter 132 filters and passes the N IF target signals to nonlinear devices 134 which square the respective N IF target signals and output N squared IF target signals to respective audio low pass filters 136. Non-linear devices 134 are advantageous if not only IF target but also IF reference signals are used as will be discussed further below. Therefore, at this point non-linear devices 134 and low pass filters 136 can be bypassed and the N IF target signals can be input directly to analog-to-digital (A/D) converter 136. An analog-to-digital (A/D) converter 138 synchronously samples and digitally multiplexes the N IF target signals output by audio low pass filters 136. A digital processor 140 then receives the digitized signals from A/D converter 138 and calculates and sends position information to flight controller 8 via a bus 141. Digital processor 140 synchronizes data gathering with the generation of RF chirp ramping by RF chirp source 102 by sending RF chirp source 102 clock information via line 143. Digital processor 140 can also digitally create chirps and digital-to-analog convert these digital chirps to an analog chirped RF signal for modulating light source 106. An example of digital processor 140 is an IBM AT compatible microcomputer with a Mercury MC-32-AT-IO-6 vector processing board.

The active electronics as described above may be packaged as a unit 142 and placed in an electro-magnetic shield 145 (FIGS. 1 and 3) and thus confined to a single location on helicopter 6. Electro-magnetic shield 145 can be made of metal and could shield controller 8 as well.

The delays $\delta T_{T1}, \ldots, \delta T_{Ti}, \ldots, \delta T_{TN}$ vary due to temperature changes of first transmitting fiber 110, transmitting/receiving fiber 110', the N second transmitting fibers 114 and receiving fiber 126. This can lead to significant errors in the position measurement of rod 124. For example, temperature sensitivity of the index of refraction for glass is approximately $10^{-5}/°C$. so that a shift in temperature of 150° C. can lead to a 4.5 cm range measurement error for a 30 meter long fiber. In addition, vibrations in first transmitting fiber 110, optical coupler 112, N second transmitting fibers 114 or receiving fiber 126 can cause a shift in the peak frequencies $F_{T1}, \ldots, F_{TN}$. Therefore, the position of corner cube 122 and consequently of rod 124 in each position sensor head 116 cannot be determined with high accuracy by solely measuring the peak frequencies $F_{T1}, F_{T2}, \ldots, F_{TN}$ of the N intermediate frequency target signals.

The effects due to temperature variations and mechanical vibrations and cable length tolerances are eliminated by producing and processing N chirped IM optical "reference" signals along with the N chirped IM optical target signals as discussed below. These N chirped IM optical reference signals experience nearly identical delays from temperature fluctuations and fiber vibrations as the N chirped IM optical target signals. The N chirped IM optical reference signals are detected by photodiode receiver 128 which outputs N corresponding chirped RF reference signals which are also mixed with mixer 108 to produce N IF reference signals.

The N chirped IM optical reference signals are produced, for example, from radiation scattered back off tips 115 (FIG. 4) of N second transmitting fibers 114 due to a fibercore/air interface at tips 115. They can also be produced using connectors or fusion iced in-line references which are relatively close (e.g. <1 m) to tips 115 of N second transmitting fibers 114. Hence, the N chirped IM optical signals are scattered back through N second transmitting fibers 114, optical coupler 112 and return fiber 126, and are detected by photodiode receiver 128. The amplitudes of the N chirped IM optical reference signals can be varied depending on how tips 115 are cleaved. For example, if tips 115 are cleaved at an angle with respect to a 90° transverse cross section of the N second transmitting fibers 114, then the amplitudes of the N chirped IM optical signals can be reduced. Also, if tips 115 are coated with a dielectric such as titanium dioxide (TiO2), the amplitudes of the N chirped IM optical reference signals can be increased. It is desireable to have N target and N reference signals with approximately the same amplitudes.

As will now be shown, effects due to vibrations and variations in temperature of fibers 110, 110', 114 and 126 can be eliminated and the delay $\delta_{ti}$ can be obtained for each of the N sensor heads 116 by measuring and appropriately processing the target and reference peak frequencies $F_{R1}, F_{T1}, \ldots, F_{RN}, F_{TN}$. The $i^{th}$ total fiber length $L_{Fi}$ is related to the $i^{th}$ IF reference frequency $F_{Ri}$ as follows:

$$F_{Ri} = 2B/T \ (L_{Fi}/v_f); \qquad \text{Eq. (2a)}$$

and the $i^{th}$ total fiber length $L_{Fi}$ and the $i^{th}$ target distance $L_{Si}$ are related to the $i^{th}$ target frequency $F_{Ti}$ as follows:

$$F_{Ti} = 2B/T \ (L_{Fi}/v_f + L_{Si}/c); \qquad \text{Eq. (2b)}$$

where,
i = 1, 2, ... N
B = chirp bandwidth,
T = chirp duration,
$v_f$ = fiber propagation velocity,
c = speed of light,
$L_{Fi}$ = length of total fiber to the $i^{th}$ sensor lead 116.
$L_{Si}$ = distance between tip 115 and corner cube 122 for $i^{th}$ sensor head 116.

Difference frequencies $F_{Di}$ can then be obtained, where $F_{Di} = F_{Ti} - F_{Ri}$, and i = 1, 2, ..., N.

Using Equations (2a) and (2b), the difference frequency $F_{Di}$ for each of the i = 1, ..., N position sensor heads 116 is, $$F_{Di} = (2B/T) \ (L_{Si}/c), \qquad \text{Eq. (3a)}$$

from which the target position $L_{Si}$ is, $$L_{Si} = F_{Di} \ (cT/2B). \qquad \text{(Eq. 3b)}$$

Equation 3b can be used to determine the position $L_{Si}$ of rod 124 in each position sensor head 116. Hence, the position measurement of each rod 124 is independent of mechanical and thermal effects that change the fiber length or propagation velocity of optical radiation in any of the fibers in optical position sensing system 100.

Figure 6A:
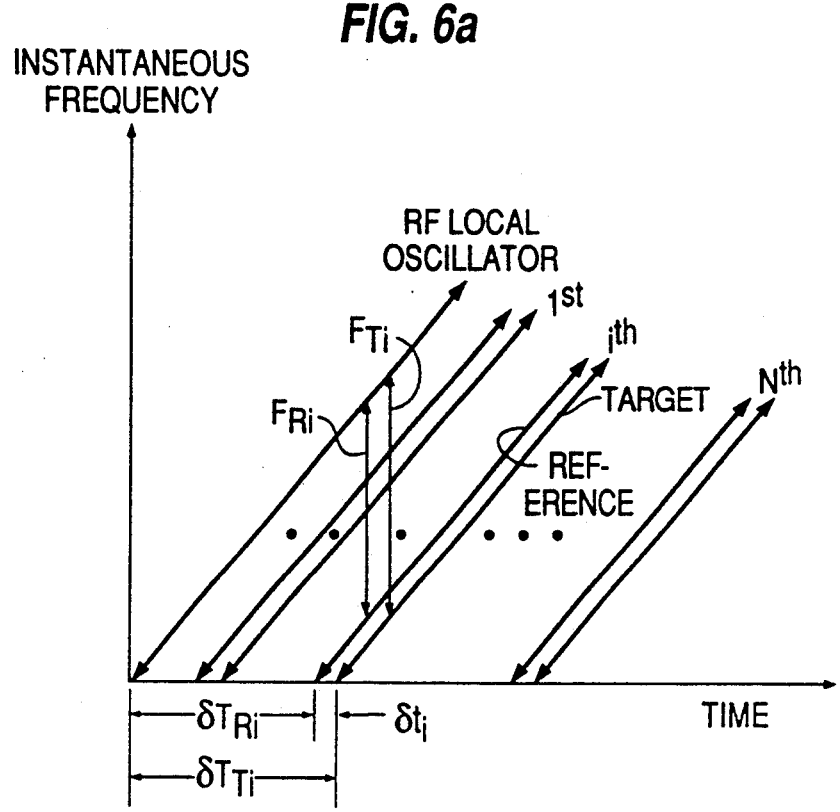
FIGS. 6a-6c correspond to FIGS. 5a-5c but with an additional N chirped optical reference signals.
Figure 6B:
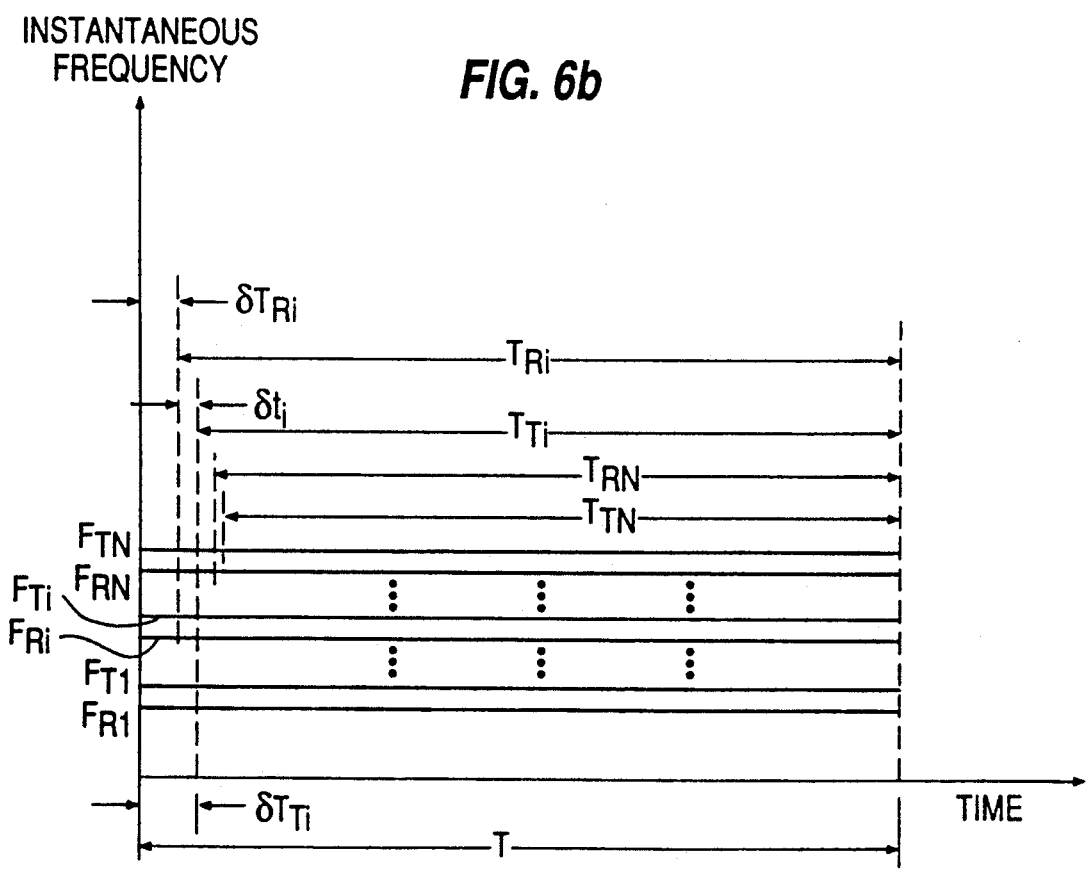
Figure 6C:
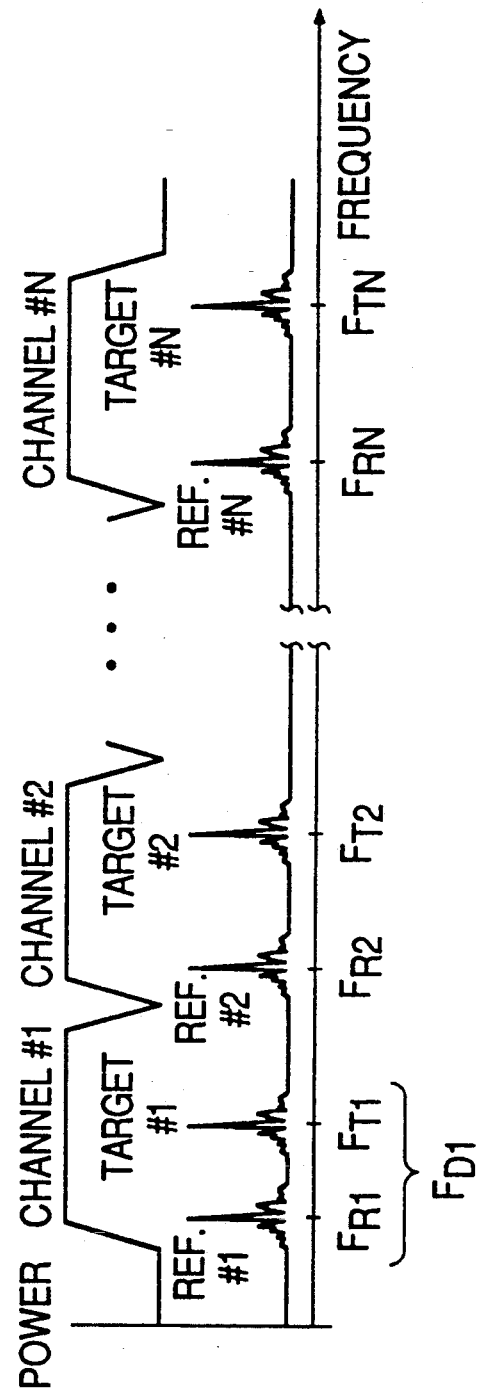

FIGS. 6a–6c correspond to FIGS. 5a–5c with the additional N chirped optical reference signals. FIG. 6a shows the RF local oscillator signal and the 1 st, ..., ith, ..., $N^{th}$ delayed chirped RF target and reference signals at the input of RF mixer 108. The 1 st, ..., ith, ..., $N^{th}$ delayed chirped RF target signals have delays $\delta T_{T1}, \ldots, \delta T_{Ti}, \ldots \delta T_{TN}$, respectively and the 1 st, ..., ith, ..., $N^{th}$ delayed chirped RF reference signals have delays $\delta T_{R1}, \ldots, \delta T_{Ri}, \ldots \delta T_{RN}$, respectively.

FIG. 6b is a graphical representation of the N IF target signals with peak frequencies $F_{T1}, \ldots, F_{Ti}, \ldots, F_{TN}$ and the N corresponding IF reference signals with peak frequencies $F_{R1}, \ldots, F_{Ri}, \ldots, F_{RN}$, respectively, and chirp duration T. The delay of the $i^{th}$ IF target signal is $\delta T_{Ti}$ and the delay of the $i^{th}$ reference signal is $\delta T_{Ri}$. Since the $i^{th}$ IM optical target signal traveled a longer distance than the corresponding $i^{th}$ IM optical reference signal for each position sensor head 116, the delay of the $i^{th}$ target signal $\delta T_{Ti}$ is greater than the delay of the $i^{th}$ reference signal $\delta T_{Ri}$. Consequently, the peak frequency $F_{Ti}$ of the $i^{th}$ IF target signal is greater than the peak frequency $F_{Ri}$ of the $i^{th}$ IF reference signal as shown in FIG. 6b.

FIG. 6b also shows that the $i^{th}$ IF target signal is available to be sampled by A/D converter 138 for a time $T_{Ti}$ and the $i^{th}$ IF reference signal is available to be sampled for a time $T_{Ri}$, where $$T_{Ti} = T - \delta T_{Ti} \qquad \text{Eq. (4)}$$

$$T_{Ri} = T - \delta T_{Ri}$$

Typically, sensor heads 116 are located 20 to 30 meters from active electronics unit 142 and therefore $\delta T_{Ti}$ and $\delta T_{Ri}$ are much smaller than T. Consequently the time that A/D converter 138 can sample the target signal and the reference signal is approximately the duration T of the chirp. The difference in delay between the delay of the target signal $\delta T_{Ti}$ and the delay of the reference signal $\delta T_{Ri}$ is $\delta t_i$, i.e., $$\delta t_i = \delta T_{Ti} - \delta T_{Ri} \qquad \text{Eq. (5)}$$

Since the $i^{th}$ IM optical target signal must travel a round trip distance which is twice the target position $L_{Si}$, the $i^{th}$ delay $\delta t_i$ is related to the $i^{th}$ target position $L_{Si}$ by $$L_{Si} = \frac{c\delta t_i}{2} \qquad (6)$$

FIG. 6c shows a frequency spectrum of the IF target and reference signals at the output of RF mixer 108 when the N chirped RF reference signals are mixed with the local oscillator signal. The peak frequencies $F_{R1}, F_{R2}, \ldots, F_{RN}$ corresponding to each of the N IF reference signals will vary with temperature and vibrations in a manner nearly identical to variations in peak frequencies $F_{T1}, F_{T2}, \ldots, F_{TN}$, respectively, of the IF target signals.

N channel filter 132 in FIG. 3 is made of N bandpass filters with output channels 1, ..., N coupled into non-linear devices 134. Non-linear devices 134 produce both sum terms $F_{Si} = F_{Ti} + F_{Ri}$ and difference terms $F_{Di} = F_{Ti} - F_{Ri}$. Transfer characteristics of non-linear device 134 should be as close to "square law" as possible so as to minimize harmonics of the difference frequencies $F_{Di}$. Examples of non-linear devices 134 include crystal detectors, mixers, RF power detectors or zero-biased diodes, saturated amplifiers, logarithmic amplifiers, analog multipliers and limiters.

The outputs of non-linear devices 134 are input to audio low pass filters 136 in order to eliminate the sum terms $F_{Si}$. Analog-to-digital (A/D) converter 138 synchronously samples and digitally multiplexes analog signals output by audio low pass filters 136. Digital processor 140 receives the digitized difference signals from A/D converter 138 and determines the N difference frequencies $F_{D1}, \ldots, F_{DN}$ relative to which the positions $L_{Si}$ of rods 124 are directly proportional, independent of temperature variations and vibration as previously explained.

An alternative approach to obtaining $F_{Di}$ involves bypassing nonlinear devices 134 and directly determining peak frequencies $F_{Ri}$ and $F_{Ti}$ using digital processor 140. Once peak frequencies $F_{Ri}$ and $F_{Ti}$ are determined, difference frequency $F_{Di}$ could be calculated by subtracting $F_{Ri}$ from $F_{Ti}$ using digital processor 140, thereby cancelling out errors due to temperature variations and mechanical vibrations as discussed above. In addition, this approach can cancel out errors caused by the non-repeatability in the slope (frequency versus time) of chirps. However, this approach can result in a performance penalty due to non-linearities in frequency versus time of any one chirp output by chirp source 102 as will now be discussed.

A theoretically best performance achievable by a signal processor which estimates a peak frequency of a tone in additive white Gaussian noise is discussed in "High-Precision Fiber-Optic Position Sensing Using Diode Laser Radar Techniques" by G. L. Abbas et al., SPIE Vol. 1219, *Laser-Diode Technology and Applications II* (1990), incorporated herein by reference. There it is shown that estimation error $\delta L_{Ti}$ (which is defined here to be the accuracy of the estimation) and target signal-to-noise density ratio ($SNDR_{TARi}$) at the output of photodiode receiver 128 for the $i^{th}$ IF target signal are given by $$\delta L_{Ti} = \frac{(3)^{\frac{1}{2}} c}{2\pi B (SNDR_{TARi} \cdot T)^{\frac{1}{2}}}, \qquad \text{Eq. (7a)}$$

and $$SNDR_{TARi} = \frac{\text{SIGNAL POWER}_{TARi}}{\text{SHOT NOISE} + \text{THERMAL NOISE} + \text{INTENSITY NOISE}}, \qquad \text{Eq. (7b)}$$

where SHOT NOISE and THERMAL NOISE are receiver parameters, INTENSITY NOISE is a laser parameter, B is the RF chirp bandwidth, T is the estimation time (chirp duration), and c is the speed of light. Similarly, the estimation error $\delta L_{Ri}$ and reference $SNDR_{REFi}$ for an optimal estimator is given by $$\delta L_{Ri} = \frac{(3)^{\frac{1}{2}} c}{2\pi B (SNDR_{REFi} \cdot T)^{\frac{1}{2}}}, \qquad \text{Eq. (8a)}$$

and $$SNDR_{REFi} = \frac{\text{SIGNAL POWER}_{REFi}}{\text{SHOT NOISE} + \text{THERMAL NOISE} + \text{INTENSITY NOISE}}, \qquad \text{Eq. (8b)}$$

As can be seen from Equations 7a and 8a, increasing the chirp bandwidth B and the sampling time T decreases the estimation errors $\delta L_{Ti}$ and $\delta L_{Ri}$, respectively. Finally, assuming independence of target error $\delta L_{Ti}$ and reference error $\delta L_{Ri}$, differential range RMS error $\delta L_{Si}$ is, $$(\delta L_{Si})^2 = (\delta L_{Ti})^2 + (\delta L_{Ri})^2. \qquad \text{Eq. (9)}$$

Referring to FIG. 1, controller 8 of helicopter 6 typically requires data from sensor heads 4 (or 116 in FIG. 3) to be output at rates exceeding several hundred Hz and lag times under about 0.5 ms. Therefore, the chirp duration T should not exceed about 1 ms. In addition, actuators such as actuator 20 of FIG. 2, can have stroke lengths $L_i$ ranging from 0.5 cm to over 50 cm requiring an accuracy $\delta L_{Si}$ of less than 200 micrometers depending on the particular actuator. In order to achieve this accuracy, the chirp bandwidth B should be as large as possible. Referring to FIG. 4, if T=1 ms and B=6 GHz, each additional millimeter of separation between reference reflector (e.g., tip 115) and target reflector (e.g., corner cube 122) results in 40 Hz increase in difference frequency $F_{Di}$. Therefore, if tip 115 and corner cube 122 are separated by 50 cm, i.e., $L_{Si}=50$ cm, then $F_{Di}$ is 20 kHz. In this case, the peak frequency $F_{Ti}$ of the $i^{th}$ IF target and the peak frequency $F_{Ri}$ of the $i^{th}$ IF reference signal must be determined to within a few Hz in order to achieve accuracies of a few hundred micrometers. This means that RF chirp source 102 must output a chirp which is linear to within a few kHz. In practice such linearity is not achievable over such a broad bandwidth and at such high chirp rates. However, non-linear devices 134 eliminate errors due to non-linearities of chirp source 102 as will be discussed below.

Figure 7A:
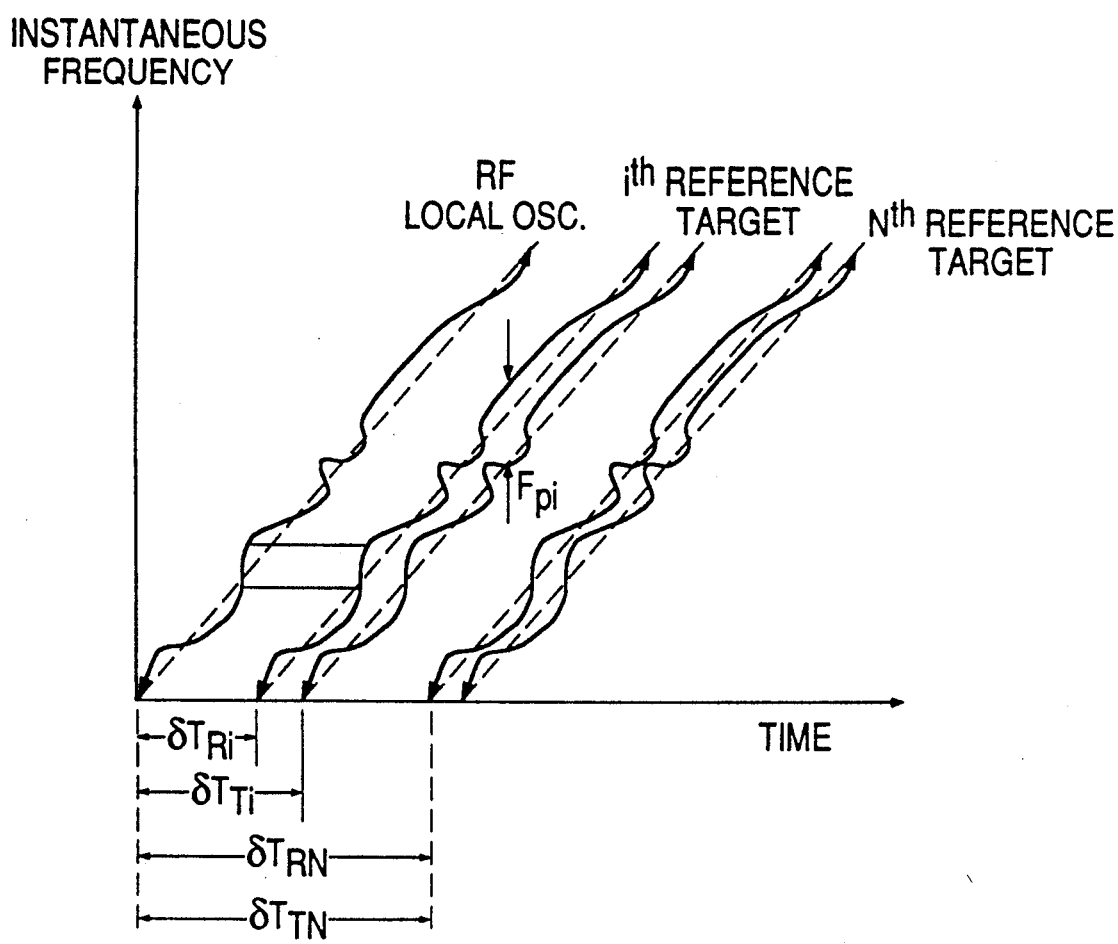
FIGS. 7a-7c correspond to FIGS. 6a-6c but with non-linear RF chirps output from chirp source 102 of FIG. 3.
Figure 7B:
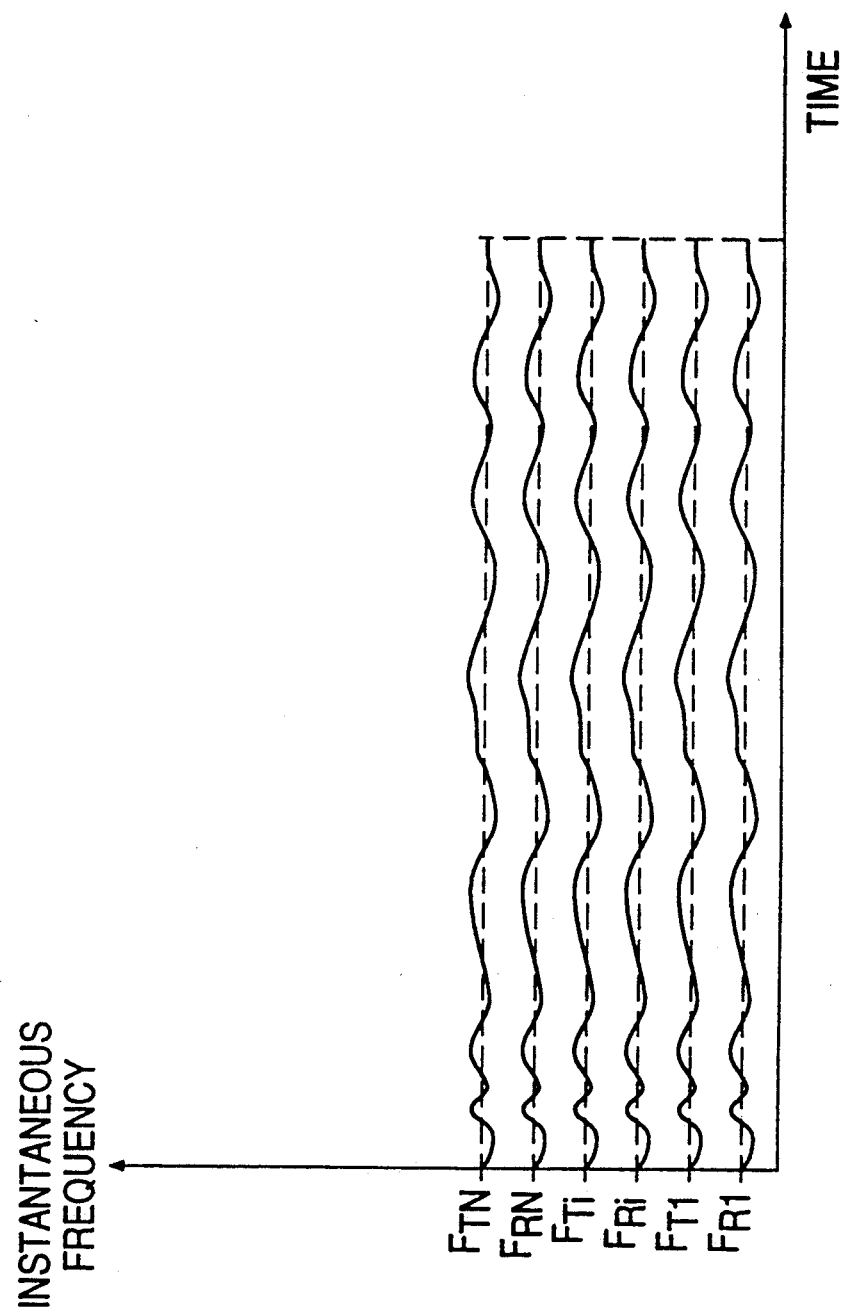
Figure 7C:
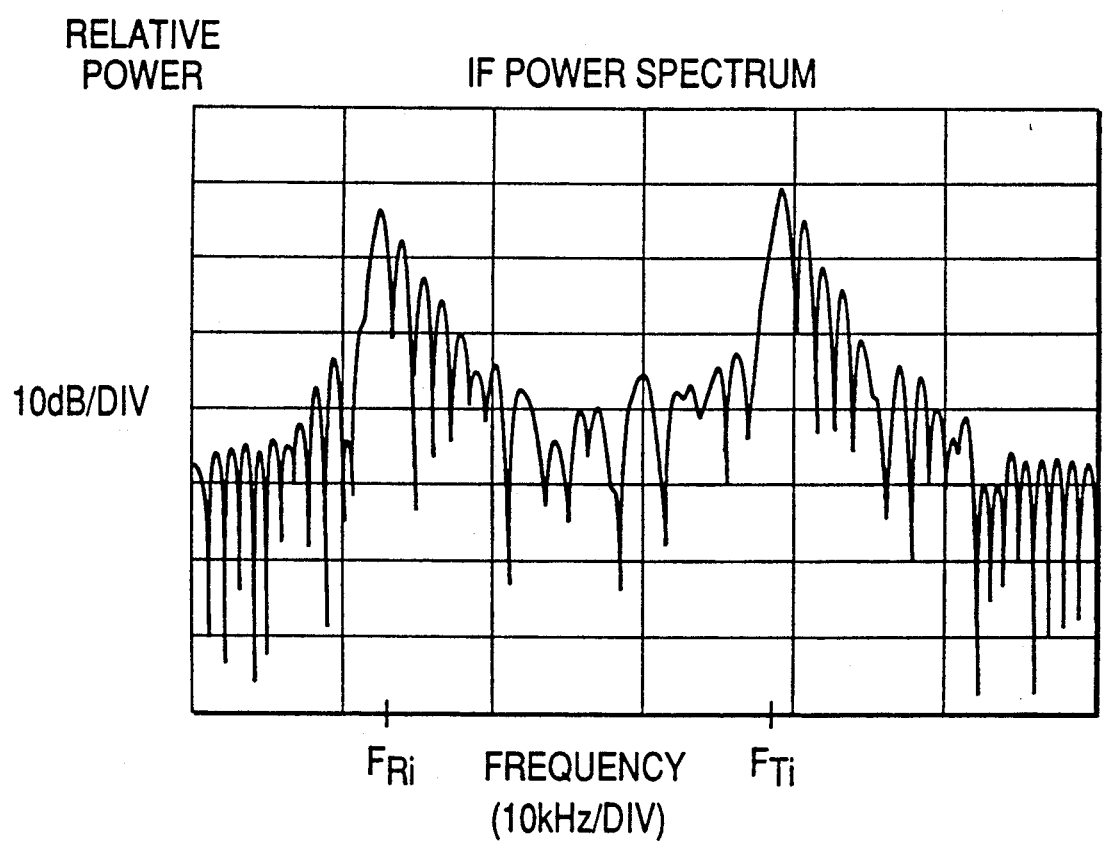

FIGS. 7a-7c correspond to FIGS. 6a-6c but with nonlinear frequency versus time variations which occur in RF chirp source 102. FIG. 7a shows the RF local oscillator signal and the 1 st, . . . , ith, . . . , and $N^{th}$ delayed non-linear chirped target and reference signals at the input of RF mixer 108. The 1 st, . . . , ith, . . . , $N^{th}$ delayed non-linear chirped RF target signals have delays $\delta T_{T1}, \ldots, \delta T_{Ti}, \ldots \delta T_{TN}$, respectively, and the 1 st, . . . , ith, . . . , $N^{th}$ delayed nonlinearly chirped RF reference signals have delays $\delta T_{R1}, \ldots, \delta T_{Ri}, \ldots \delta T_{RN}$, respectively.

FIG. 7b corresponds to FIG. 6b taking into account nonlinearity of the chirped RF signal output by RF chirp source 102. If the total optical path length of the $i^{th}$ second transmitting fiber 114 added to the first transmitting fiber 110, transmitting/receiving fiber 110', and receiving fiber 126 is much larger than the corresponding stroke length $L_i$, then the condition $\delta t_i << \delta T_{Ti} \approx \delta T_{Ri}$ holds. In this case, non-linearities appearing at the output of mixer 108 nearly identically track each other as shown in FIG. 7b.

FIG. 7c shows a possible output of one of the channels in N channel filter 132. The distortions of the spectrum shown in FIG. 7c can be attributed to non-linear chirps produced by RF chirp source 102. Although the main lobes of the spectra corresponding to IF target and reference signals are identifiable, there is significant distortion around their peaks. These spectral distortions result in significant estimation errors of the peak frequencies $F_{Ri}$ and $F_{Ti}$. This distortion can be so great that the main lobes can be difficult to distinguish from the side lobes and it may be impossible to resolve the target signal from the reference signal.

Figure 8:
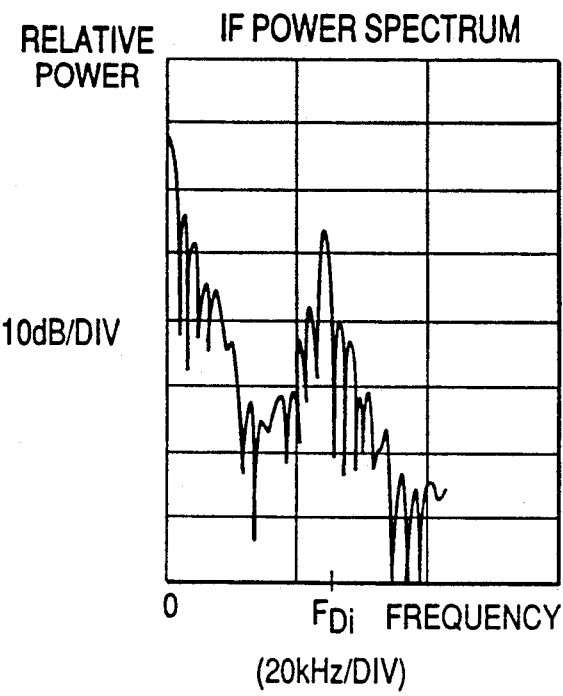
FIG. 8 shows a measured spectrum at a single channel output of audio low pass filters 136 of FIG. 3 after the N IF target and N IF reference signals pass through non-linear devices 134.

FIG. 8 shows a measured spectrum for a single channel output of audio low pass filters 136 after the N IF target and N IF reference signals pass through non-linear devices 134. Here, the spectrum of the difference signal with peak frequency $F_{Di}$ and a DC signal is shown, with the spectrum corresponding to the difference signal being nearly symmetric about its peak frequency. The side lobes of the spectrum of the difference signal are about 12 dB down from the main lobe peak. As the ratio of delays $\delta t_i/\delta T_{Ri}$ increases, the advantage obtained by using non-linear devices 134 decreases, because non-linearities appearing in the reference signals and target signals will not track each other as well. However, as long as the condition $\delta t_i << \delta T_{Ri}$ is valid, RF chirp source 102 need not output extremely linear chirps and yet it is possible to obtain an extremely accurate estimation of peak frequency $F_{Di}$ using digital processor 140.

Figure 9A:
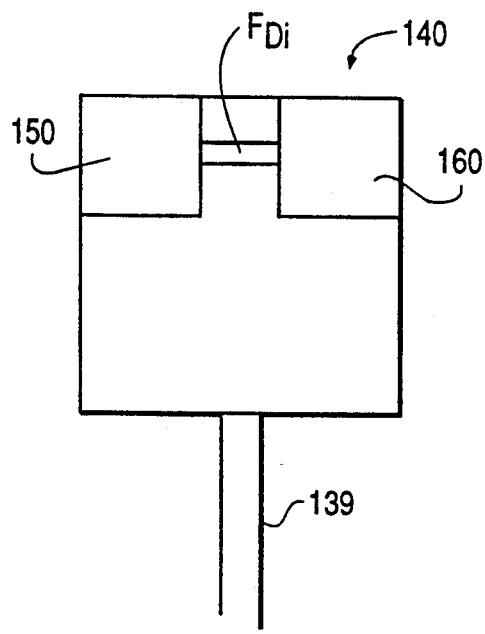
FIG. 9a is a block diagram functional representing the digital processor in FIG. 3.
Figure 9B:
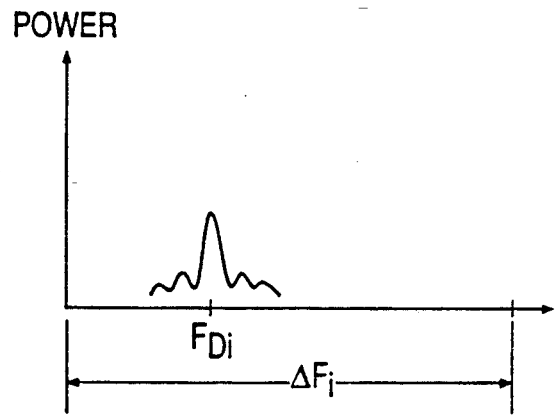
FIG. 9b shows power versus frequency graphical representation of the bandwidth $\Delta F_i$ corresponding to full stroke length $L_i$ of the $i^{th}$ position sensor head.

The peak frequencies $F_{Di}$ of the difference signals appearing at the output of audio low pass filters 136 can be estimated with high accuracy using digital processor 140 as follows. FIG. 9a is a block diagram illustrating a functional representation of digital processor 140 which includes a searcher 150 and a tracker 160. FIG. 9b shows the bandwidth $\delta F_i$ corresponding to a full stroke length $L_i$ for $i^{th}$ position sensor head 116. Once searcher 150 acquires a first peak frequency of the difference signal, searcher 150 outputs this information to tracker 160. Digital processor 140 is in a search mode until peak frequency $F_{Di}$ has been output to tracker 160 at which point processor 140 goes into a tracking mode. The peak frequency of the difference signal $F_{Di}$ is then tracked by tracker 160 and updated at high rates with short lag times.

Figure 10:
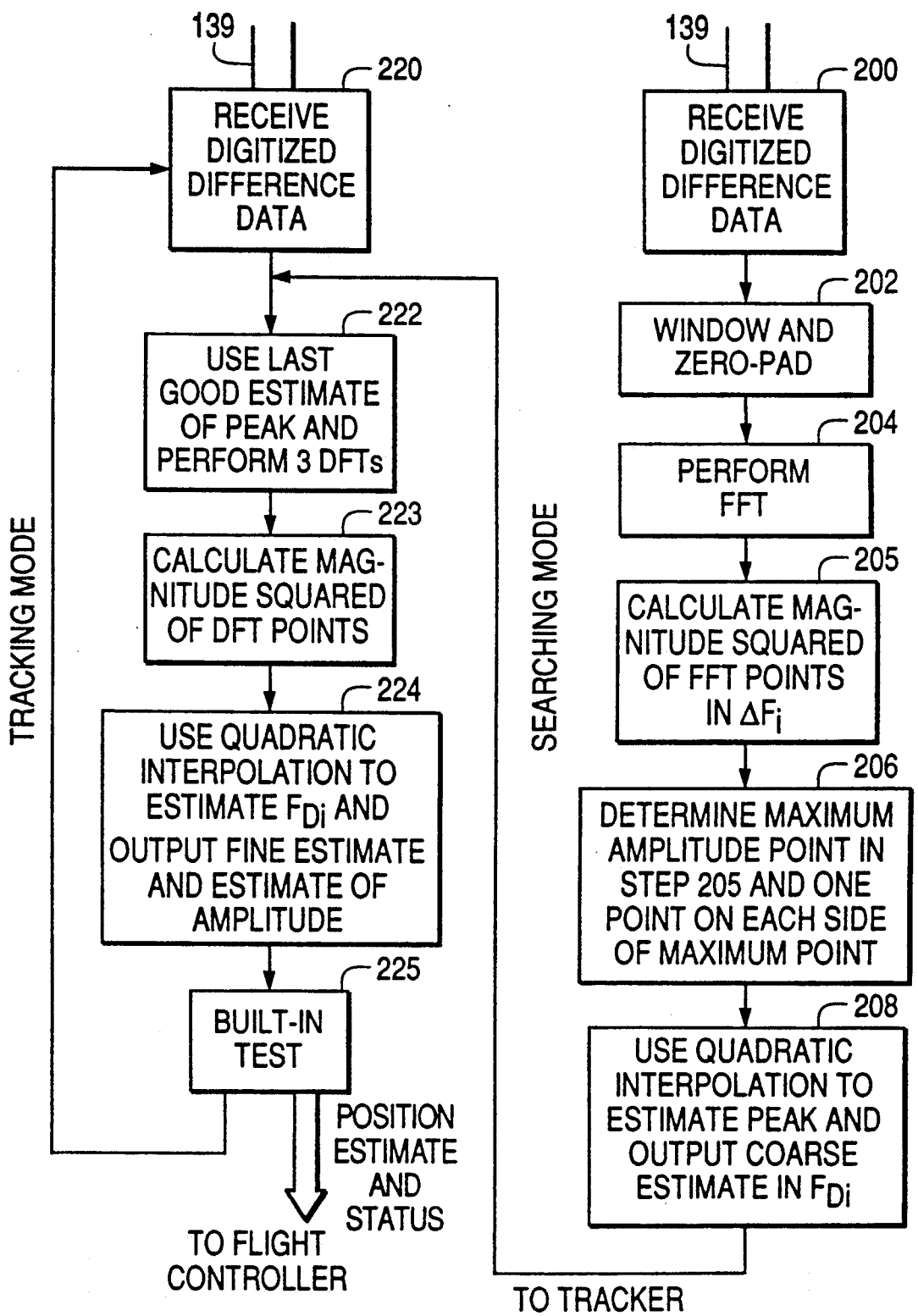
FIG. 10 is a flow diagram which shows processing steps for the search mode and the tracking mode of the digital processor in FIG. 9b.

FIG. 10 shows processing steps for the search mode and the tracking mode of processor 140 using digital processing techniques as are found in *Digital Signal Processing* by Oppenheim and Schafer, Prentice Hall, Inc., Englewood Cliffs, N.J. (1975), incorporated herein by reference. Searcher 150 is activated when processor 140 is in the search mode (steps 200-208) and tracker 160 is activated when processor 140 is in the track mode (steps 220-226). Searcher 150 operates as follows. At step 200, digital processor 140 receives the $i^{th}$ digitized difference data on databus 139 from A/D converter 138. Searcher 150 then windows and zero pads the $i^{th}$ digitized difference data at step 202 and a fast Fourier transform (FFT) is performed using the $i^{th}$ windowed zero-padded difference data at step 204 according to the processing techniques described in *Digital Signal Processing*, cited above. A Tukey window is used in order to suppress any interfering tones and to reduce bias as a consequence of the $i^{th}$ difference signal being available to be sampled only for a finite duration which is approximately the chirp duration T as discussed above. Tukey windows are also discussed in *Digital Signal Processing*. The FFT data is squared at step 205 and searcher 150 then selects the maximum of the squared FFT data and one point on each side of the maximum point at step 206. Searcher 150 then performs quadratic interpolation at step 208 using the 3 points from step 206 to provide a coarse estimate of the peak difference frequency $F_{Di}$.

Figure 11A:
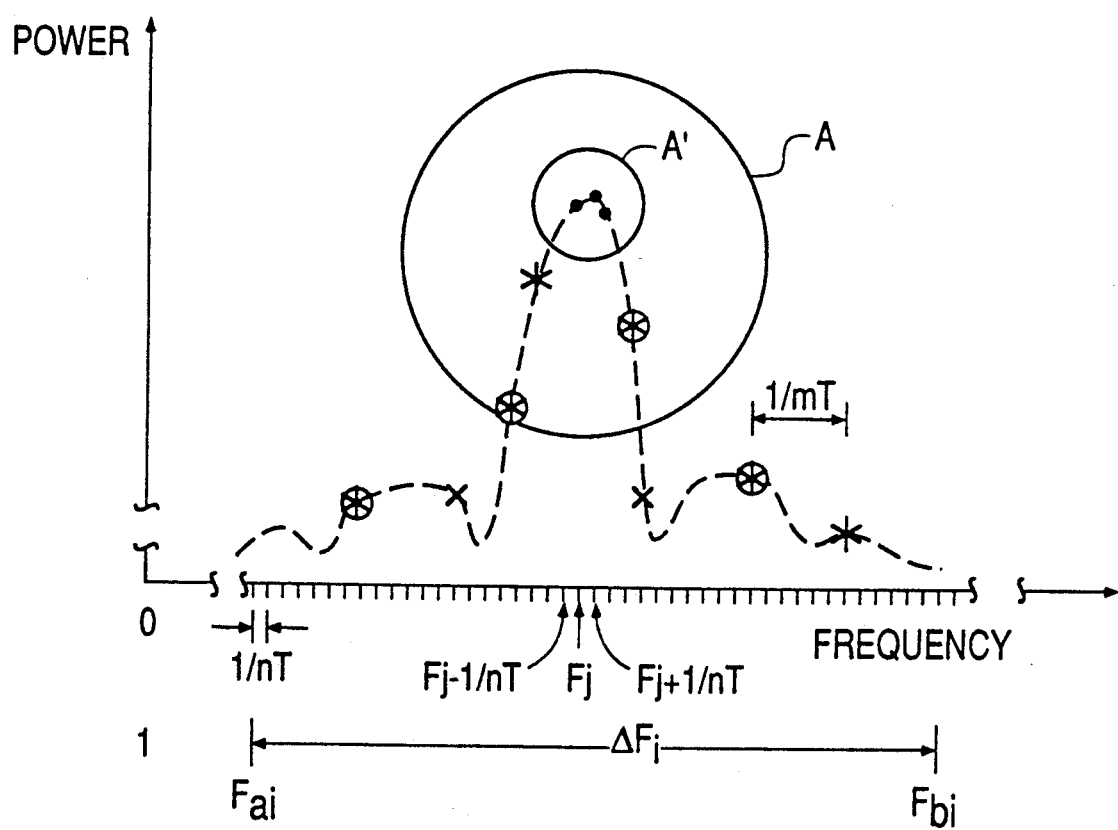

FIG. 11a shows the plot of amplitude versus frequency after performing the FFT of step 204 and the magnitude squaring of step 205. In general, for an observation time T, zero-padding by a factor of m increases the resolution from 1/T to 1/mT. The asterisks "*" with no circles correspond to $i^{th}$ Fourier transformed difference data absent zero-padding. The asterisks with circles together with the asterisks without circles represent the Fourier transformed zero-padded data resulting from step 204. Here, the resolution of the spectrum was doubled because the number of zeros added to the difference data was chosen to be $N_s$ (the number of sample points). This guarantees that 4 FFT points lie on the main lobe of the Fourier transformed difference signal and therefore that there will always be 3 points on the main lobe which can be used in quadratic interpolation step 208. Since the time available for sampling the $i^{th}$ difference signal is approximately T=1 ms and the $i^{th}$ difference signal is sampled for the entire time it is available to be sampled (approximately T as discussed above), the FFT output at step 204 has a resolution of 1/2 T=500 Hz, that is, the peak frequency of the difference signal $F_{Di}$ can be determined to within 500 Hz. However, the signal-to-noise density ratio of the target and reference IF signals (Equations 7b and 8b, respectively) as well as estimation error Equations 7a, 8a and 9 indicate that the difference frequency $F_{Di}$ can be determined to much higher accuracies (e.g. <1 Hz). Therefore, after the magnitude squaring step 205 is performed, quadratic interpolation step 206 is used to obtain a coarse estimate of difference frequency $F_{Di}$.

Once searcher 150 has output the coarse estimation of the difference frequency $F_{Di}$, it goes into the tracking mode as shown in FIG. 10. The first time through steps 220-224 (the tracking mode) tracker 160 uses the same set of $i^{th}$ difference data used in the searching mode together with the coarse estimate of difference frequency $F_{Di}$ to determine a fine estimate of difference frequency $F_{Di}$. In particular, at step 222, the coarse estimation of the difference frequency $F_{Di}$ from searcher 150 (step 210) is used together with the initial set of $i^{th}$ digitized difference data obtained at step 220 to calculate three discrete Fourier transform (DFT) points. FIG. 11b shows inside circle A of FIG. 11a containing the 3 squared zero-padded windowed FFT difference data. Quadratic interpolation step 20 involves calculating the location of the peak of the hypothetical quadratic "a". The coarse estimation of the difference frequency $F_{Di}$ is the frequency which corresponds to this location. Steps 223 and 224 are similar to steps 205 and 208, respectively, but uses the three points in circle A' (see FIG. 11c) rather than the three points in circle A (see FIG. 11b). The bandwidth $\Delta Fi$ corresponding to a full stroke Li is divided into J frequency bins of width $1/(nT)$ where n and J are integers and $J/(nT)=\Delta Fi$. The coarse estimate of the difference frequency $F_{Di}$ is used to determine which of all J possible frequencies is closest to the coarse estimate of the difference frequency $F_{Di}$. Since the frequency locations Fj are fixed, two weighing vectors Sj and Cj of dimension Ns (number of sample points) for each location Fj can be determined in advance and permanently stored in processor 140. Processor 140 can store the weighing vectors Sj and Cj corresponding to all J frequency locations Fj i=1 ... J in advance. Then calculations of the 3 DFT points (step 222) only involves six dot products of each of the vectors (Sj−1, Cj−1) (Sj, Cj) and (Sj+1, Cj+1) with data Ai output from step 220. Once the fine estimate of difference frequency $F_{Di}$ and the corresponding amplitude is obtained, built in test step 225 is used to determine the quality of the estimate of $F_{Di}$. The last good estimate of $F_{Di}$ is output to flight controller 8, steps 220-225 are repeated, but with tracker 160 receiving a new set of $i^{th}$ digitized difference data.

Figure 11C:
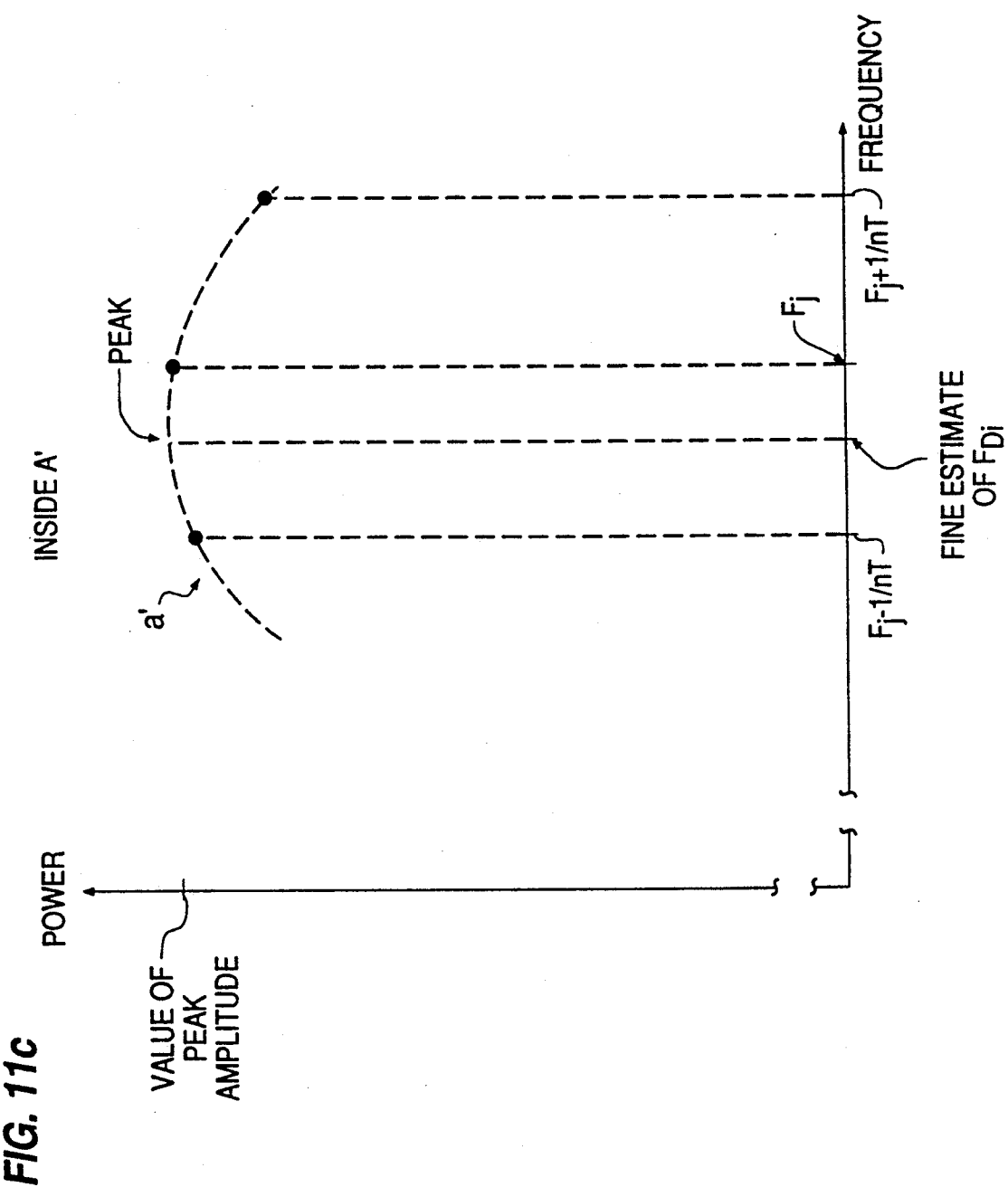

The 3 points in circle A' in FIG. 11a are shown as large dots in FIG. 11c. The curve a' formed by dashed lines represents a hypothetical quadratic function defined by the three points in circle A'. Quadratic interpolation step 208 involves calculating (estimating) the location of the peak of the hypothetical quadratic a'. If the frequency spacing from padding step 202 is 1/10 T=100 Hz (i.e., n=10) and a Tukey window is used, then quadratic interpolation step 208 results in a worst case difference frequency estimation error for $F_{Di}$ of less than 1 Hz for tones greater than or equal to 20 kHz. For B=6 GHz this corresponds to a worst case position error of 1/40 mm=25 micrometers. Finally, if the strokelength Li=50 cm, then bandwidth $\delta F_i=20$ kHz and the total number J of frequency bins $F_j$ is 200.

Step 225 includes checking the quality of the estimation of the difference frequency. This can be done by using the value of the amplitude of the quadratic interpolation estimate of $F_{Di}$. If the amplitude changes by more than a predetermined amount, for example, 10% of the amplitude of the last good estimate of $F_{Di}$, then the measurement may be invalid. In such a case, the previous estimate of $F_{Di}$ is used in step 222 rather than the current estimate.

Tracker 160 repeats steps 220-225 at rates corresponding to position update rate $R'_i$. In addition, step 222 of tracker 160 can be performed in a much shorter time than step 204 of searcher 150 because step 204 requires approximately $pN_s \log_2 pN_s$ calculations, whereas step 222 requires approximately $6N_S$ calculations where $N_s$ is the number of sample points and p is an integer corresponding to the number of sets of $N_s$ zeros which are added to the original Ns sample points. This enables digital processor 140 to output frequency $F_{Di}$ with high accuracies ($\delta Fi$ of less than 1 Hz) over a bandwidth $\delta Fi$ of 20 kHz corresponding to stroke length Li of 50 cm with lag time $T_{Li}$ less than 0.5 ms. Lag time $T_{Li}$ can be reduced to nearly zero by performing dot products on the incoming data as it is being collected.

Figure 12A:
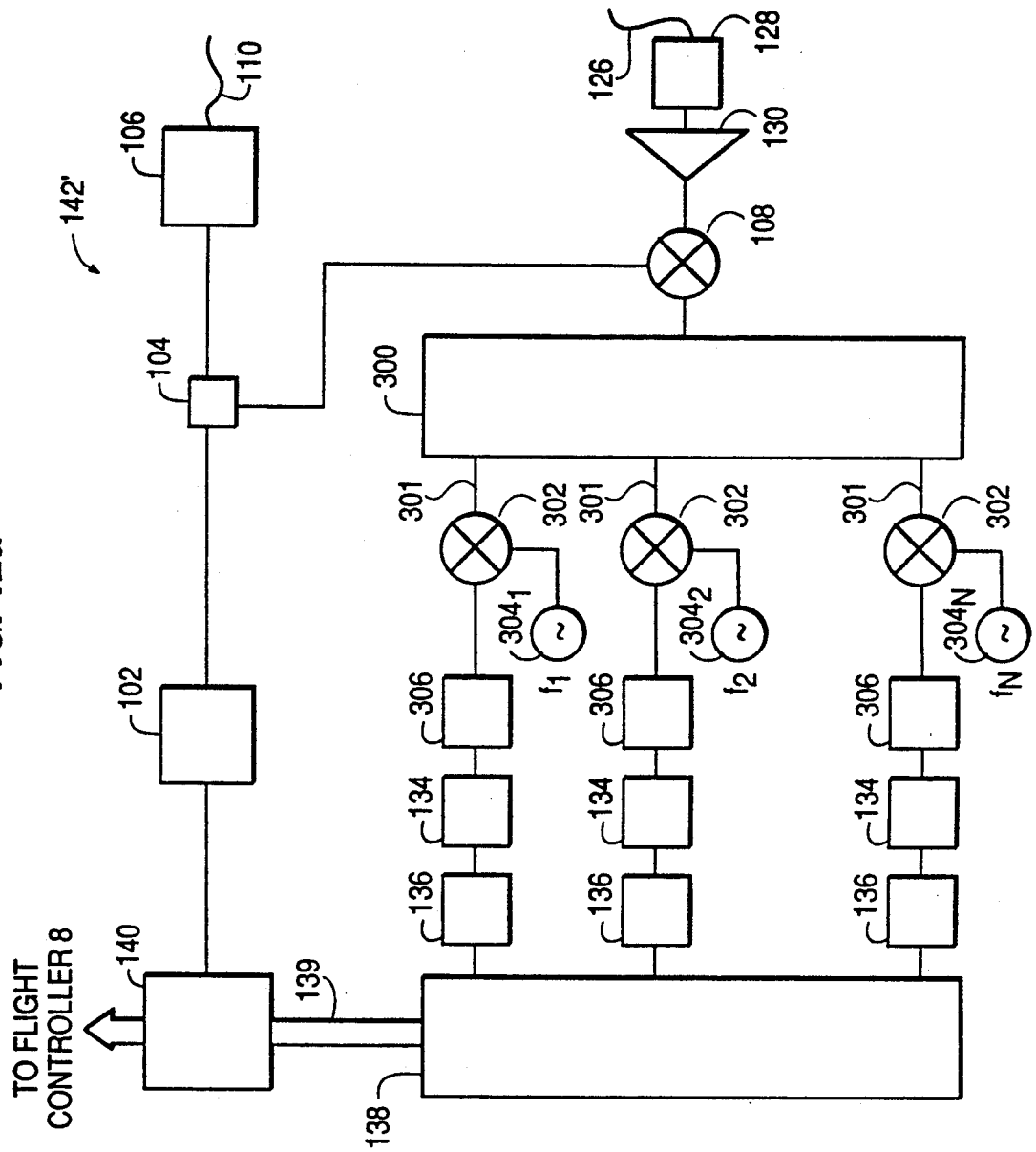
FIGS. 12a and 12b are block circuit diagrams of other embodiments of an optical position sensing system employing principles according to the invention.

FIG. 12a is a schematic diagram of a second embodiment of the invention with an active electronics unit 142' corresponding to active electronics unit 142 in FIG. 3. Like elements in FIGS. 3 and 12a have corresponding reference numerals. In this second embodiment, RF mixer 108 outputs the N IF target signals and N IF reference signals to an N-way RF power splitter 300 which has N RF outputs 301. Each of N RF outputs 301 has all 2N IF signals but at reduced power levels.

The 2N RF outputs 301 are input to N mixers 302, each of which is mixed with a mixing frequency fi from signal generators $304_i$ where i=1, ..., N. The frequencies fi of each of signal generators $304_i$ are chosen so that RF mixers 302 output N frequency shifted target IF signals and N frequency shifted reference IF signals with frequencies $F_{Ti}$ and $F_{Ri}$, respectively. Filters $306_{i-N}$ receive the N frequency shifted target IF signals and N frequency shifted reference IF signals. Each mixing frequency fi output by signal generator $304_i$ is chosen so that the corresponding $i^{th}$ frequency $F_{Ti}$ of $i^{th}$ frequency shifted target IF signal and frequency $F_{Ri}$ of $i^{th}$ frequency shifted reference IF signal is passed by the $i^{th}$ filter 306.

N non-linear devices 134 receive and square the filtered N frequency shifted target and N frequency shifted reference IF signals and each non-linear device 134 outputs a sum and difference signal with frequencies $F_{Si}$ and $F_{Di}$, respectively, for each of N position sensor heads 116. Finally, audio low pass filters 136 pass only the difference signals with peak frequencies $F_{Di}$ to A/D converter 138, and digital processor 140 searches and tracks successive peak frequencies $F_{Di}$ as discussed above.

Figure 12B:
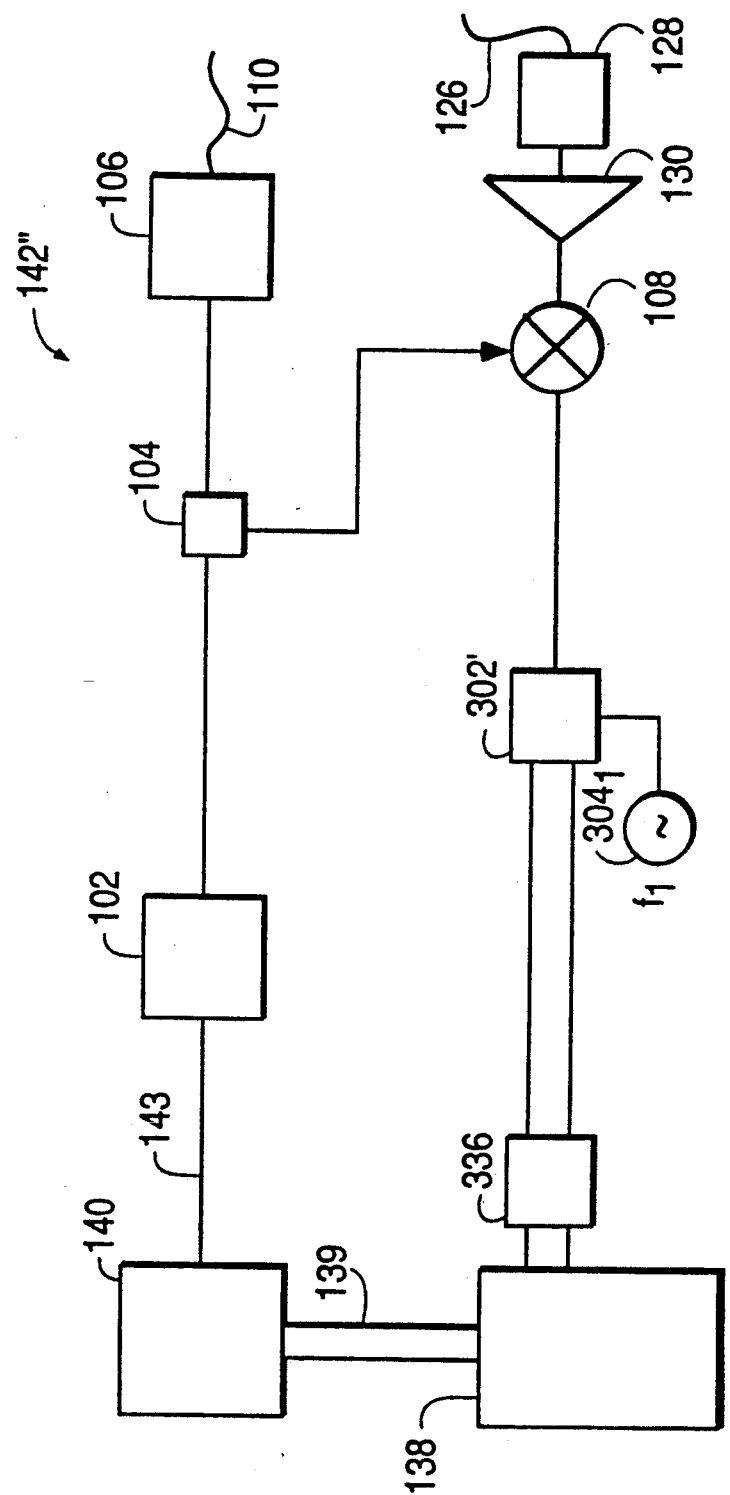
Figure 13A:
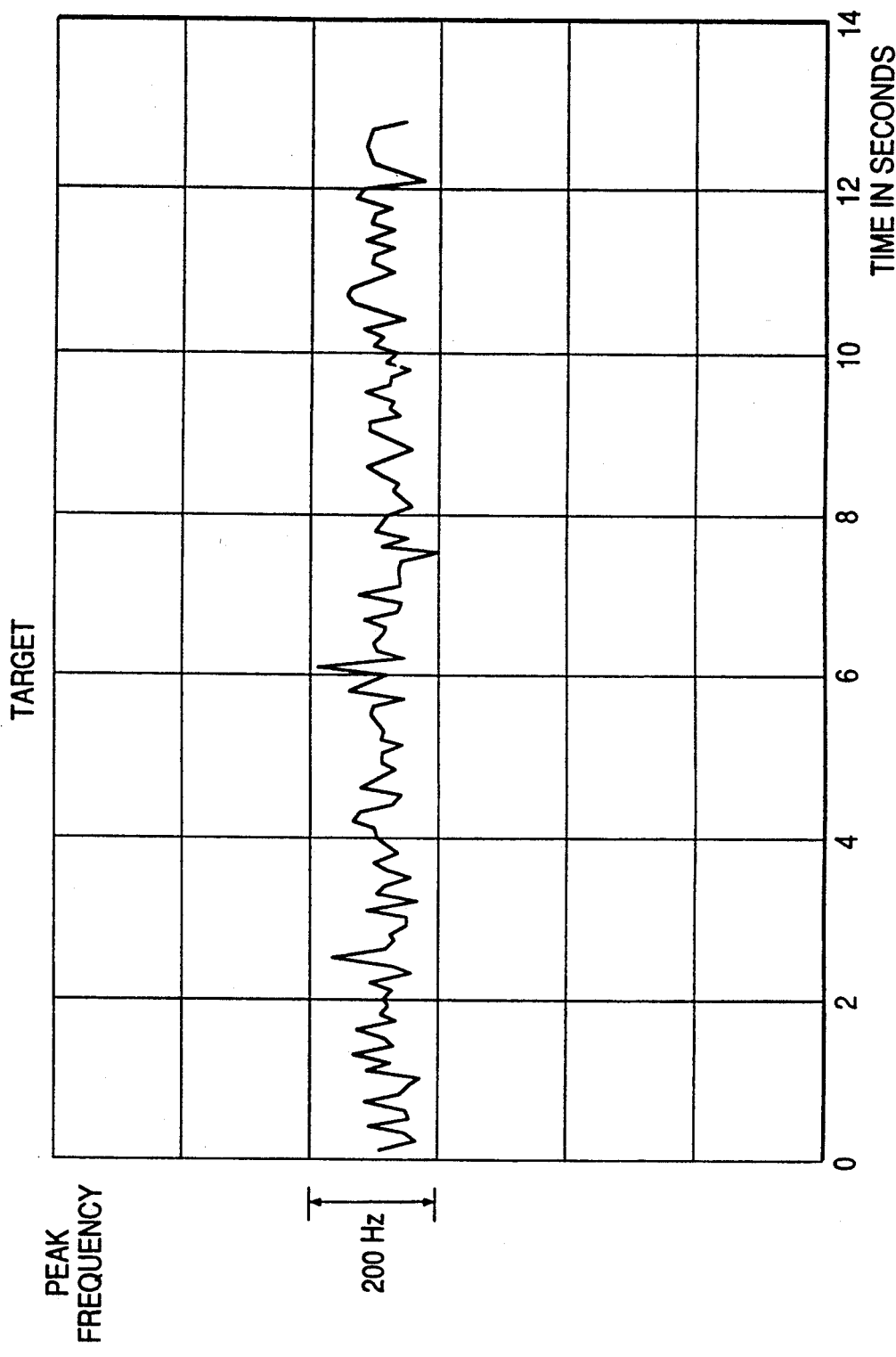
FIGS. 13a-13c show a series of actual output data for a fiber optic position sensor system according to the invention.
Figure 13B:
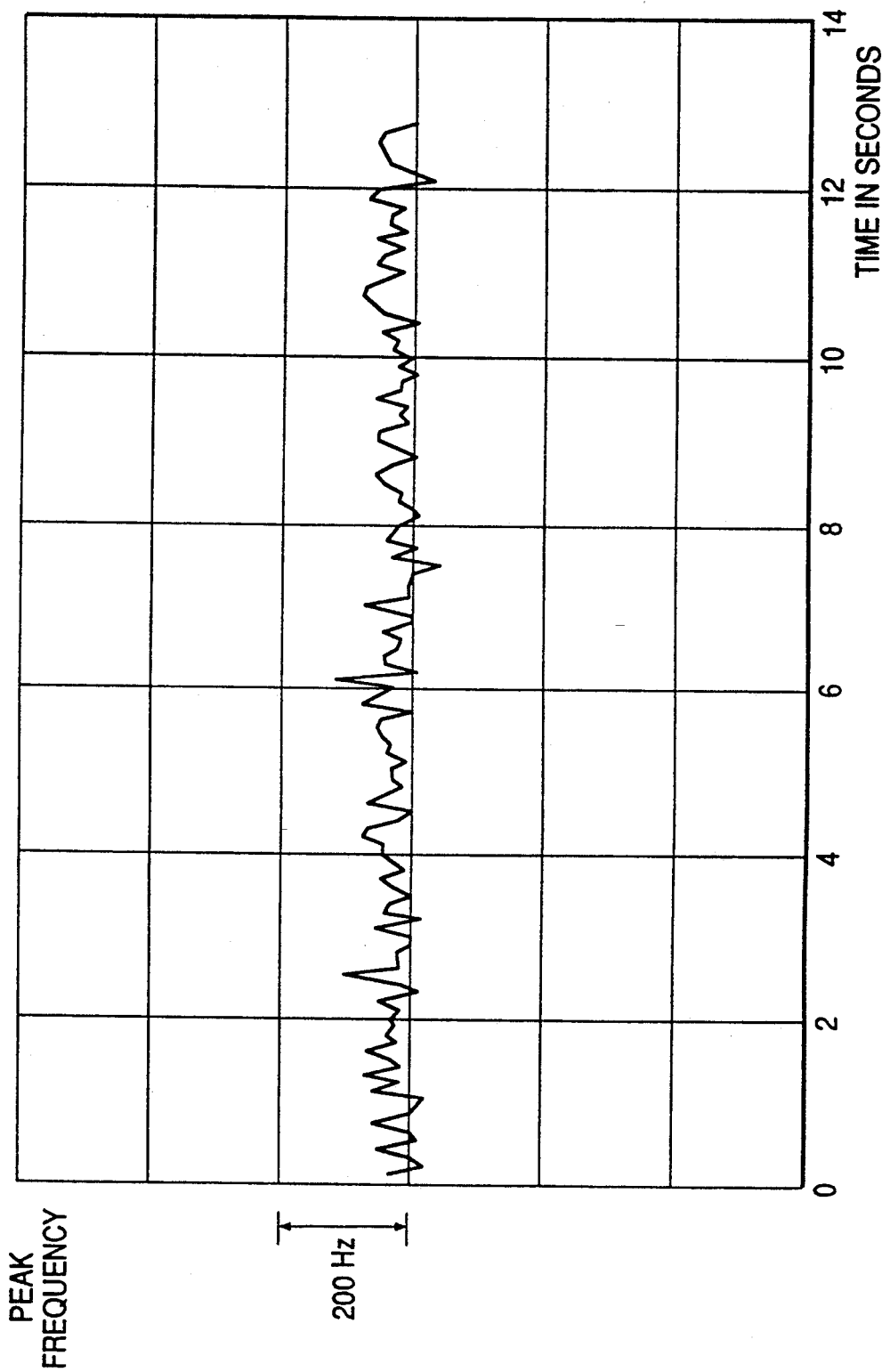
Figure 13C:
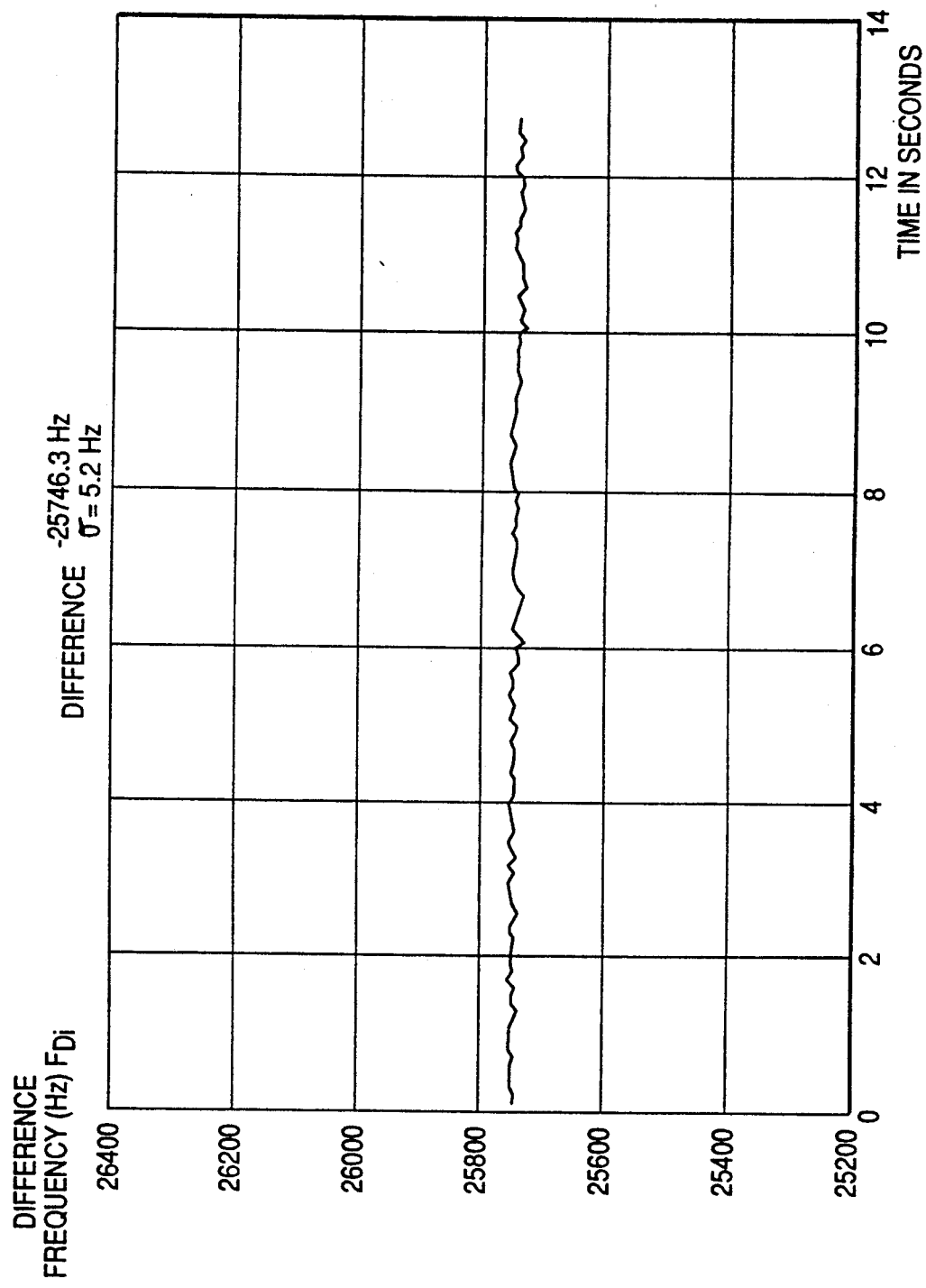

FIG. 12b shows an actual setup of a fiber optic position sensing system employing principles of the invention, at a fixed temperature and no vibrations using a chirped bandwidth of B=6 GHZ, chirp duration T=1 ms and update rate $R'_i=10$ Hz. Here, however, an IQ demodulator 302' or quadrature mixer RR-48 by KDI/Triangle Electronics was used. IQ demodulator has two outputs, one corresponds to the signal output by mixers 302 in FIG. 12a and the other corresponds to that same signal shifted in phase by 90 degrees. These signals are filtered by IQ filters 36 and sampled by A/D converter 138. One linear position sensor head 116 was used along with active electronics unit 142" without non-linear devices 134. FIGS. 13a-13c show a series of actual output data for a fiber optic position sensing system of FIG. 12b. In this case, since the peak frequencies $F_{T1}$ and $F_{R1}$ were fairly well defined, it was possible to simply subtract the peak frequency $F_{T1}$ from the peak frequency $F_{R1}$ to obtain difference frequency $F_{D1}$.

FIG. 13a shows a series of 130 actually measured peak target frequencies $F_{T1}$. An average target IF peak frequency, $aveF'_{T1}$ was measured with an RMS error of $\delta F_{T1} = 28.8$ Hz, which corresponds to a target measurement error (position measurement accuracy) $\delta L_{T1}$ of 0.72 mm.

FIG. 13b shows a corresponding frequency versus time graph of 130 actually measured peak reference frequencies $F_{R1}$. An average reference IF peak frequency, $aveF'_{R1}$ IF was measured with an RMS error of $\delta F_{R1} = 28.0$ Hz which corresponds to a measured—reference position error (position measurement accuracy) $\delta L_{R1}$ of 0.7 mm.

FIG. 13c shows the resulting difference frequencies $F_{D1}$. Here the difference frequency $F_{D1}$ is $F_{T1} - F_{R1}$, which yields an average difference frequency $aveF_{D1}$ of 25,746.3 Hz. The average difference frequency, $aveF_{D1} = 25,746.3$ Hz had an RMS error (position measurement accuracy) $\delta F_{D1}$ of 5.2 Hz which corresponds to a relative target position error of $\delta L_{SI} = 0.13$ mm.

According to equation 9, if the target error and reference error are independent of each other, the expected error $\delta L_{SI}$ should be $$\delta L_{SI} = [(0.7)^2 + (0.72)^2]^{\frac{1}{2}} = 1.0 \text{ mm}.$$

However, since the target position error $\delta L_{Si}$ was measured to be 0.13 mm, errors in the target position and reference position are not independent of each other, and consequently contributions to errors $\delta F_{T1}$ and $\delta F_{R1}$ due to non-repeatability in the RF chirps are significantly reduced.

Estimation of the actual difference frequency of the difference signal shown in FIG. 8 was achieved using active electronics unit 142 in FIG. 1, i.e., using non-linear devices 134. Here, with $T = 1$ ms, $B = 6$ GHz, $R_i = 250$ Hz, $T_{Li} = 100$ microseconds and with the difference signal having approximately the same signal-to-noise density ratio as the previous example, an rms position error of 50 micrometers was achieved. Therefore, in addition to cancelling non-repeatability of chirp slope from RF chirp source 102, errors due to non-linearities in each individual chirp were also significantly reduced.

Figure 14:
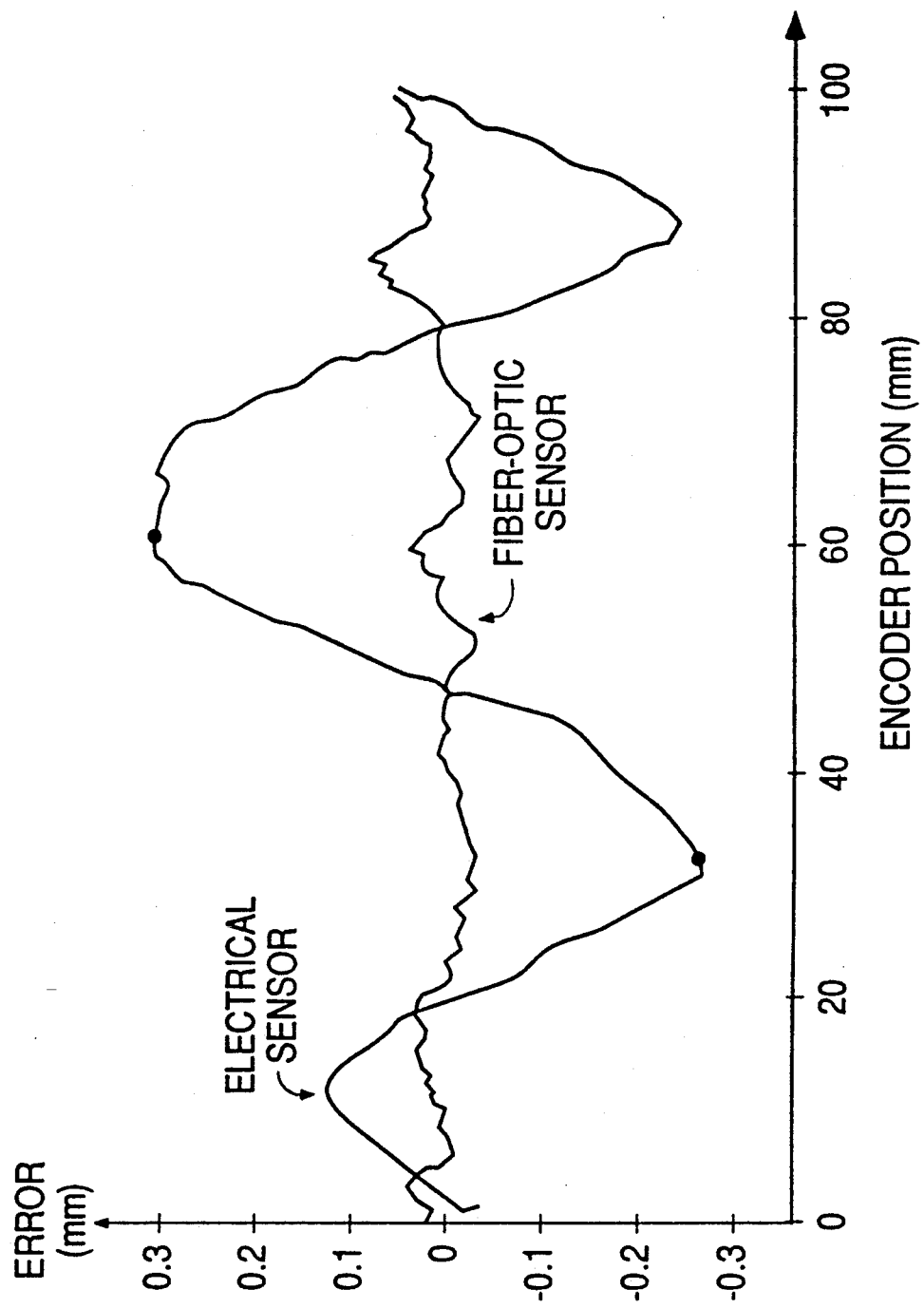
FIG. 14 shows a series of bias errors from a fiber optic position sensor system as compared to an electric sensor.

FIG. 14 shows a plot of bias errors in position measurements by a fiber optic position sensing system employing principles of the invention (including non-linear devices 134) compared to bias errors in position measurements by an electronic sensor. The target was moved 100 mm in known increments and its position measured while at rest. Here, the chirp bandwidth $B = 6$ GHz, chirp duration $T = 1$ ms, update rate $R'_i = 250$ Hz and a lag time $T_{Li} = 100$ microseconds. The RMS error of the fiber optic position sensing system with one sensor head 116 was measured to be 25 micrometers. The RMS error for the fiber optic position sensing system was measured to be 45 micrometers when optical losses resulting from $N = 6$ sensor heads 116 were introduced.

Figure 15:
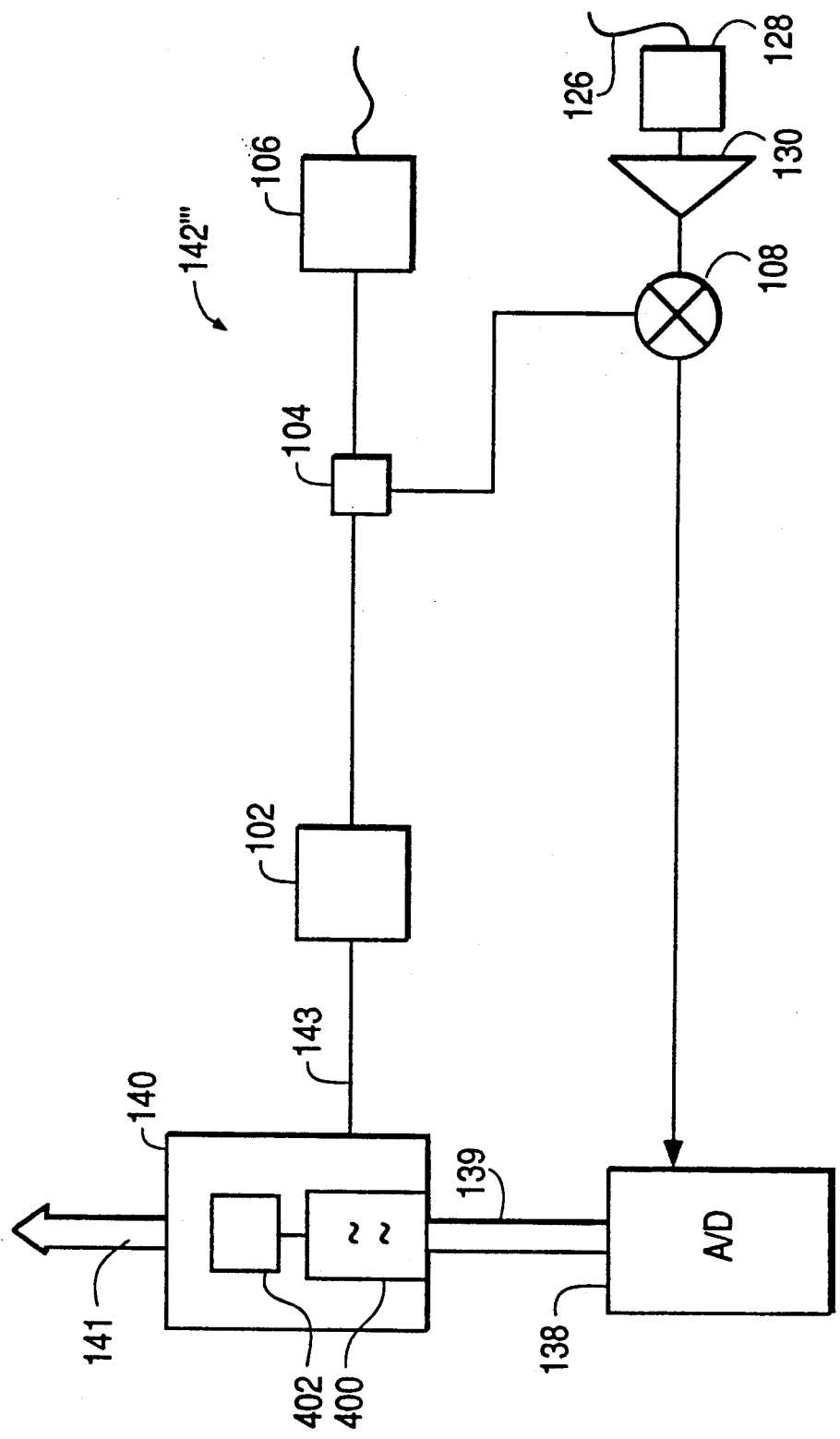
FIG. 15 is a block circuit diagram of another embodiment of the invention utilizing digital filtering and squaring.

Finally, as was mentioned above, the squaring accomplished by non-linear devices 134 can be done digitally. FIG. 15 is a block circuit diagram of an embodiment of active electronics unit 142''' with a digital filter 400 and a digital squaring unit 402. Digital filter 400 and digital squaring unit 402 can be implemented using specifically designated hardware or using software with digital processor 140. The sampled data from A/D converter 138 are input to filter 400 and filtered and then input to digital squaring unit 402 and squared. Then the difference signal of the squared digital data from digital squaring unit 402 is input to searcher 150 to acquire a coarse estimate of difference frequency $F_{Di}$ and then to tracker 160 for a fine estimate of the difference frequency $F_{Di}$. Hence, searcher 150 and tracker 160 operate in the same manner as described above.

Obviously, numerous and additional modifications and variations of the present invention are possible in light of the above teachings. It is therefore to be understood that within the scope of the appended claims, the invention may be practiced otherwise than as specifically claimed.

What is claimed is:

1. An optical position sensing system for sensing the position of a displaceable element, comprising:
   electro-optical means for outputting a modulated optical signal and a chirped radio frequency signal, an envelope of the modulated optical signal having a phase that has a known relation to the phase of the chirped radio frequency signal;
   light guide means coupled to said electro-optical means for receiving and transmitting the modulated optical signal along an optical path for reflection off a surface of the displaceable element to provide a position sensing optical signal;
   reference reflecting means disposed in the optical path upstream of the displaceable element for partially reflecting the transmitted modulated optical signal to provide a reference optical signal;
   transducing means having an output and two inputs, one of the two inputs electrically coupled for receiving the chirped radio frequency signal and the other of the two inputs optically coupled for receiving the position sensing optical signal and the reference optical signal having, respectively, first and second time delays with respect to the chirped radio frequency signal, said transducing means producing at its output a multi-frequency electrical signal which includes first and second frequencies corresponding to the first and second time delays, respectively; and
   position detecting means coupled to the output of said transducing means for processing the multi-frequency signal for determining a difference frequency corresponding to the difference between the first and second frequencies and representing the position of the displaceable element.

2. The system as claimed in claim 1 wherein said electro-optical means comprises:
   radio frequency source means for producing the chirped radio frequency signal; and
   controllable light source means having a modulating input coupled to the chirped radio frequency signal for producing the modulated optical signal.

3. The system as claimed in claim 2, wherein said radio frequency source means comprises a yttrium-iron garnet oscillator.

4. The system as claimed in claim 2, wherein said light source means comprises a diode light source.

5. The system as claimed in claim 2, wherein said light source means comprises a solid state light source.

6. The system as claimed in claim 1, wherein said position detecting means includes an analogue-to-digital converter for converting the multi-frequency signal into a corresponding digital signal.

7. The system as claimed in claim 6, wherein said position detecting means further includes processing means connected to said analogue-to-digital converter for digitally squaring the multi-frequency signal to produce a squared signal including a difference signal having a peak region in the frequency domain containing the difference frequency.

8. The system as claimed in claim 6, wherein said position detecting means further includes processing means connected to said analogue-to-digital converter for receiving the digital signal and performing a padded fast Fourier transform on the digital signal to obtain the difference frequency.

9. The system as claimed in claim 1, wherein said light guide means comprises multimode fiber.

10. The system as claimed in claim 1, wherein the displaceable element is displaceable over a given stroke, and said position detecting means detects an initial difference frequency by searching for the difference frequency over a range of frequencies corresponding to the given stroke of the displaceable element.

11. The system as claimed in claim 10, wherein said position detecting means includes means for receiving the initial difference frequency and means for tracking the difference frequency as the difference frequency changes corresponding to variations in the position of the displaceable element.

12. The system as claimed in claim 1, wherein said electro-optical means comprises a fiber pigtailed laser diode having a fiber pigtail optically coupled to said light guide means for outputting the modulated optical signal.

13. The system as claimed in claim 1, further comprising shielding means for shielding said electro-optical means, said transducing means, and said position detecting means from electromagnetic interference and electromagnetic pulse.

14. The system as claimed in claim 1, wherein said light guide means includes an optical fiber having a tip remote from said electro-optical means and said tip constitutes said reference reflecting means.

15. The system as claimed in claim 14, wherein said tip has a dielectric coating.

16. The system as claimed in claim 1 forming a combination with a displaceable element having a retroreflecting surface for retroreflecting the modulated optical signal.

17. The combination as claimed in claim 16, wherein said retroreflecting surface comprises a retroreflecting material coated onto said displaceable element.

18. The combination as claimed in claim 16, wherein said retroreflecting surface comprises a corner cube fastening to said displaceable element.

19. The system as claimed in claim 1, wherein there are a plurality of displaceable elements the respective positions of which are to be sensed, and said light guide means includes:
 a plurality of optical fibers receiving and transmitting the modulated optical signal along respective optical paths for reflection off respective surfaces of the plurality of displaceable elements to produce respective position sensing optical signals, with one said reference reflecting means being disposed in each one of the optical paths for generating an optical reference signal associated with each position sensing optical signal; and
 optical coupling means for coupling the respective position sensing optical signals and associated reference optical signals to the other input of said transducing means;
 wherein the multi-frequency electrical signal output by said transducing means includes pairs of first and second frequencies, with the first and second frequency of each pair corresponding to the time delays of each position sensing optical signal and associated reference optical signal, respectively, and said position detecting means determines a plurality of difference frequencies from the multi-frequency output, each difference frequency corresponding to the difference between the first and second frequencies of a respective pair of first and second frequencies and representing the position of a respective one of the displaceable elements.

20. The system as claimed in claim 19, wherein said light guide means further includes a single optical fiber connected to said electro-optical means for receiving and transmitting the modulated optical signal and said optical coupling means includes means for distributing the modulated optical signal from said single optical fiber to said plurality of optical fibers.

21. The system as claimed in claim 20, wherein the position sensing optical signals and reference optical signals are retroreflected in respective ones of said plurality of optical fibers, and said optical coupling means includes another single optical fiber having one end connected to the other input of said transducing means, a second end and means for coupling the position sensing optical signals and the reference optical signals from said plurality of optical fibers into the second end of said other single optical fiber.

22. The system as claimed in claim 19, wherein the optical fibers of said light guide means have lengths selected so that the difference frequencies do not overlap.

23. The system as claimed in claim 1, wherein said position detecting means comprises non-linear means for squaring the multifrequency signal and outputting a squared signal including a difference signal having a peak region in the frequency domain containing the difference frequency.

24. The sensing system as claimed in claim 23, wherein said position detecting means comprises filtering means following said squaring means for passing only the difference signal.

25. The system as claimed in claim 1, wherein said position detecting means comprises:
 signal generating means for generating a radio frequency mixing signal; and
 mixing means having one input connected for receiving the radio frequency mixing signal, a second input connected for receiving the multi-frequency signal and an output for producing a frequency shifted multi-frequency signal.

26. The system as claimed in claim 25, wherein said position detecting means further comprises non-linear means having an input for receiving the frequency shifted multifrequency signal and an output for producing a difference signal having the difference frequency.

27. The sensing system as claimed in claim 1, wherein said electro-optical means outputs a chirped radio frequency signal with a chirp bandwidth of at least 6 GHz and a chirp duration less than approximately 1 ms.

28. The system as claimed in claim 1, wherein said light guide means comprises a light guide section coupled for receiving and transmitting the position sensing optical signal and the reference optical signal to the input said transducing means.

29. The system as claimed in claim 1, wherein said transducing means comprises:
   optical detecting means for receiving the position sensing optical signal and the reference optical signal and an output for producing an electrical signal in dependence of the position sensing optical signal and the reference optical signal; and
   mixing means having a first input coupled for receiving the chirped radio frequency signal, a second input for receiving the electrical signal output from said optical detecting means and an output, said mixing means mixing the chirped radio frequency signal and the electrical signal and producing the multi-frequency electrical signal at the output of said mixing means.

30. The sensing system as claimed in claim 1, wherein said position detecting means comprises a searching and tracking means for acquiring and updating the difference frequency.

31. In an aircraft including a flight controller for controlling flight of the aircraft, the combination comprising:
   electro-optical means for outputting a modulated optical signal and a chirped radio frequency signal, an envelope of the modulated optical signal having a phase that has a known relation to the phase of the chirped radio frequency signal;
   light guide means optically coupled to said electro-optical means for receiving and transmitting the modulated optical signal along a plurality of optical paths;
   a plurality of position sensor heads for sensing different parameters on the aircraft, each sensor head having a displaeable element which is displaced in dependence of changes in a respective one of the parameters, each displaceable element being disposed in one of said plurality of optical paths for reflecting the modulated optical signal to provide a position sensing optical signal, and each sensor head further including reference reflecting means disposed in the optical path upstream of the corresponding displaceable element for partially reflecting the modulated optical signal to provide a reference optical signal; and
   position detecting means having an input optically coupled for receiving the position sensing optical signals and the reference optical signals, another input electrically coupled to said electro-optical means for receiving the chirped radio frequency signal, and processing means for processing the position sensing optical signals, reference optical signals and chirped radio frequency signal for outputting to the flight controller a plurality of signals representing the respective positions of the displaceable elements of the sensor heads at sufficient rates, sufficient accuracies and sufficiently short lag times to enable the flight controller to control flight of the aircraft.

32. A fiber optic position sensing system, comprising:
   source means for producing a chirped radio frequency signal;
   optical modulating means coupled to said source means for receiving the chirped radio frequency signal and producing a modulated optical signal in accordance with the chirped radio frequency signal;
   optical fiber means coupled to said optical modulating means for receiving and transmitting the modulated optical signal along an optical path;
   sensor head means disposed in the optical path of the modulated optical signal transmitted by said optical fiber means for receiving the modulated optical signal and for outputting a reference optical signal in dependence of a position of a reference object and a target optical signal in dependence of a position of a target object;
   transducing means optically coupled to the output of said sensor head means for producing an electrical signal from the reference optical signal and the target optical signal which have, respectively, first and second times delay with respect to the radio frequency chirped signal;
   mixing means having an output and inputs coupled, respectively, to said source means and said transducing means for mixing the chirped radio frequency signal from said source means and the electrical signal from said transducing means and for producing a multi-frequency signal with first and second frequencies corresponding to the first and second time delays, respectively, at the output of said mixing means; and
   frequency estimating means coupled to the output of said mixing means for estimating a difference frequency corresponding to the difference between the first and second frequencies of the multi-frequency signal, the difference frequency representing a distance between the reference object and the target object.

33. A fiber optic position sensing system comprising:
   source means for producing a chirped radio frequency signal;
   radio frequency splitter means coupled to said source means for receiving and splitting the chirped radio frequency signal into a first chirped radio frequency signal and second chirped radio frequency signal;
   optical modulating means for receiving the first chirped radio frequency signal and producing a modulated optical signal in accordance with the first chirped radio frequency signal;
   optical fiber means coupled to said optical modulating means for receiving and transmitting the modulated optical signal along an optical path;
   reference reflecting means disposed in the optical path of the modulated optical signal transmitted by said optical fiber means for partially reflecting the transmitted modulated optical signal to provide a reference optical signal;
   reflector means fixed to a displaceable element and disposed optically downstream of said reference reflecting means in the optical path of the transmitted modulated optical signal for reflecting the transmitted modulated optical signal to provide a target optical signal in dependence of the position of a target;
   optical coupling means having an output and an input for receiving the reference optical signal and the target optical signal and coupling the reference optical signal and the target optical signal to the output of said optical coupling means;
   transducing means optically coupled to the output of said optical coupling means for producing an electrical signal including first and second signal components representing first and second time delays of the reference optical signal and the target optical signal, respectively, with respect to the chirped radio frequency signal;

mixing means having an output and inputs coupled, respectively, to said radio frequency splitter means and said transducing means for mixing the first chirped radio frequency signal and the electrical signal and for outputting a multi-frequency signal including first and second frequencies corresponding to the first and second time delays, respectively;

means for acquiring an initial difference frequency corresponding to the difference between the first and second frequencies; and means for tracking subsequent difference frequencies resulting from movement of the displaceable element.

34. A high speed position sensing system for sensing the position of a displaceable element, comprising:

radio frequency source means for producing a chirped radio frequency signal having a series of radio frequency chirps each having an end of chirp time;

controllable light source means having a modulating input coupled to the chirped radio frequency signal for producing a modulated optical signal having a signal envelope with a phase that has a known relationship to the phase of the chirped radio frequency signal;

optical fiber means coupled to said light source means for receiving and transmitting the modulated optical signal along an optical path for reflection off a surface of the displaceable element to provide a position sensing optical signal;

transducing means having an input optically coupled to said optical fiber means for receiving the position sensing optical signal with a time delay in dependence of the position of the displaceable element and an output for producing an electrical signal which is a function of the position sensing optical signal;

mixing means, having an output and two inputs coupled, respectively, to said radio frequency source means and the output of said transducing means, for mixing the chirped radio frequency signal and the electrical signal and producing a signal at the output of said mixing means with a frequency corresponding to the time delay of the position sensing optical signal; and frequency detecting means coupled to the output of said mixing means for detecting and outputting, within 0.5 ms of the end of chirp time, the frequency which corresponds to the time delay as representing the position of the displaceable element.

35. A method for determining the position of a displaceable element, comprising:

producing a chirped radio frequency signal;

producing a modulated optical signal having an envelope of modulation with a phase that is known with respect to the phase of the chirped radio frequency signal;

transmitting the modulated optical signal along an optical path and reflecting the modulated optical signal off a surface of the displaceable element to provide a position sensing optical signal;

partially reflecting the transmitted optical signal at a point in the optical path prior to the surface of the displaceable element to provide a reference optical signal;

producing an electrical signal as a function of first and second time delays of the position sensing optical signal and the reference optical signal, respectively, with reference to the chirped radio frequency signal;

mixing the chirped radio frequency signal and the electrical signal to produce a multi-frequency signal with first and second frequencies corresponding to the first and second time delays, respectively; and detecting a difference frequency of the multi-frequency signal corresponding to the difference between the first and second frequencies, the difference frequency representing the position of the displaceable element.

36. The method as claimed in claim 35, wherein said detecting step includes squaring the multi-frequency signal and outputting an analog difference frequency signal.

37. The method as claimed in claim 36, wherein said detecting step further includes converting the analog difference frequency signal to digital difference frequency data.

38. The method as claimed in claim 37, wherein the displaceable element has a displacement stroke which corresponds to a range of difference frequencies, and said detecting step further comprises searching the digital difference frequency data over the range of difference frequencies for the difference frequency corresponding to a current position of the displaceable element.

39. The method as claimed in claim 38, wherein said frequency detecting step further includes tracking the difference frequency as the position of the displaceable element changes.

40. The method as claimed in claim 38, wherein said searching step further includes transforming the digital difference frequency data to the frequency domain, detecting digital difference frequency domain data representing a maximum amplitude within the frequency range, and interpolating a peak frequency from the detected digital difference frequency domain data, the interpolated peak frequency constituting an estimate of the difference frequency corresponding to the current position of the displaceable element.

41. The method as claimed in claim 40, wherein said searching step further includes windowing and zero-padding the digital difference frequency data prior to said transforming step.

42. The method as claimed in claim 41, wherein said transforming step includes performing a fast Fourier transform of the windowed zero-padded digital difference frequency data.

43. The method as claimed in claim 40, wherein said detecting step further includes tracking the difference frequency as the position of the displaceable element changes by interpolating, in the frequency domain, an updated peak frequency utilizing the peak frequency obtained during said searching step and current digital difference frequency data, and thereafter tracking the difference frequency by repeating said interpolating step using the most recent updated difference frequency in place of the difference frequency obtained during said searching step.

44. The method as claimed in claim 43, wherein said tracking step further includes calculating discrete Fourier transform points using current digital difference frequency data and the previous interpolated peak frequency.

45. The method as claimed in claim 44, wherein said interpolating step includes performing quadratic interpolation using the discrete Fourier transform points of said calculating step.

46. The method as claimed in claim 35, wherein said detecting step includes converting the multi-frequency signal to digital multi-frequency data.

47. The method as claimed in claim 46, wherein said detecting step further includes squaring the digital multi-frequency data and outputting digital difference frequency data.

48. The method as claimed in claim 47, wherein the displaceable element has a displacement stroke which corresponds to a range of difference frequencies, and said detecting step further comprises searching the digital difference frequency data over the range of difference frequencies for the difference frequency corresponding to a current position of the displaceable element.

49. The method as claimed in claim 48, wherein said frequency detecting step further includes tracking the difference frequency as the position of the displaceable element changes.

50. The method as claimed in claim 48, wherein said searching step further includes transforming the digital difference frequency data to the frequency domain, detecting digital difference frequency domain data representing a maximum amplitude within the frequency range, and interpolating a peak frequency from the detected digital difference frequency domain data, the peak frequency constituting an estimate of the difference frequency corresponding to the current position of the displaceable element.

51. The method as claimed in claim 50, wherein said searching step further includes windowing and zero-padding the digital difference frequency data prior to said transforming step.

52. The method as claimed in claim 51, wherein said transforming step includes performing a fast Fourier transform of the windowed zero-padded digital difference frequency data.

53. The method as claimed in claim 50, wherein said detecting step further includes tracking the difference frequency as the position of the displaceable element changes by interpolating, in the frequency domain, an updated peak frequency utilizing the peak frequency obtained during said searching step and current digital difference frequency data, and thereafter tracking the difference frequency by repeating said interpolating step using the most recent updated difference frequency in place of the difference frequency obtained during said searching step.

54. The method as claimed in claim 53, wherein said tracking step further includes calculating discrete Fourier transform points using current digital difference frequency data and the previous interpolated peak frequency.

55. The method as claimed in claim 54, wherein said interpolating step includes performing quadratic interpolation using the discrete Fourier transform points of said calculating step.

56. The method as claimed in claim 35, wherein said detecting step includes analyzing the multi-frequency signal and outputting a quality parameter indicating the quality of the difference frequency.

57. The method as claimed in claim 56, wherein the quality parameter is the amplitude of the multi-frequency signal at the difference frequency and said analyzing step includes determining whether a change in the amplitude exceeds a predetermined threshold.

58. The method as claimed in claim 35, wherein the displaceable element is a component in an aircraft, the aircraft includes a flight controller which receives and utilizes the detected difference frequency for controlling operation of the aircraft and said detecting step includes detecting and outputting the difference frequency to the flight controller at a sufficient rate for the flight controller to maintain control of the aircraft.

59. The method as claimed in claim 35, wherein the displaceable element is a component in an aircraft, the aircraft includes a flight controller which receives and utilizes the difference frequency for controlling operation of the aircraft, and said detecting step includes detecting and outputting the difference frequency to the flight controller at a rate of at least 200 Hz.

60. The method as claimed in claim 35, wherein the displaceable element is a component in an aircraft, the aircraft includes a flight controller which receives and utilizes the difference frequency for controlling operation of the aircraft, and said detecting step includes detecting and outputting the difference frequency to the flight controller with a lag time sufficiently short for the flight controller to maintain control of the aircraft.

61. The method as claimed in claim 35, wherein the displaceable element is a component in an aircraft, the aircraft includes a flight controller which receives and utilizes the difference frequency for controlling operation of the aircraft, and said detecting step includes detecting and outputting the difference frequency to the flight controller with a lag time less than 0.5 ms.

62. The method as claimed in claim 35, wherein the displaceable element is a component in an aircraft, the aircraft includes a flight controller which receives and utilizes the difference frequency for controlling operation of the aircraft, and said detecting step includes detecting and outputting the difference frequency to the flight controller at a sufficient accuracy for the flight controller to maintain control of the aircraft.

63. The method as claimed in claim 35, wherein the displaceable element is a component in an aircraft, the aircraft includes a flight controller which receives and utilizes the difference frequency for controlling operation of the aircraft, and said detecting step includes detecting and outputting the difference frequency to the flight controller with a corresponding position error less than 200 micrometers.

64. The method as claimed in claim 35, wherein the displaceable element is a component in an aircraft, the aircraft includes a flight controller which receives and utilizes the difference frequency for controlling operation of the aircraft, and said detecting step includes detecting and outputting the difference frequency to the flight controller at a sufficient rate, a sufficient accuracy and a sufficiently short lag time for the flight controller to maintain control of the aircraft.

65. The method as claimed in claim 35, wherein the displaceable element is a component in an aircraft, the aircraft includes a flight controller which receives and utilizes the difference frequency for controlling operation of the aircraft, and said detecting step includes detecting and outputting the difference frequency to the flight controller at a rate of 200 Hz, a corresponding position error less than 200 micrometers and a lag time below 0.5 ms.

66. The system as claimed in claim 2, wherein said radio frequency source means includes an electrically controlled radio frequency source.

67. The system as claimed in claim 2, wherein said radio frequency source means comprises:

means for creating a digital signal representing the chirped radio frequency signal; and digital-to-analog converter means, connected to said controllable light source means, for converting said digital signal into said chirped radio frequency signal.

68. The system as claimed in claim 1, wherein said light guide means comprises single mode fiber.

* * * * *